United States Patent
Ogino et al.

(10) Patent No.: US 12,271,454 B2
(45) Date of Patent: Apr. 8, 2025

(54) AUTHENTICATION SYSTEM, AUTHENTICATION METHOD, CONTROL APPARATUS, COMPUTER PROGRAM AND RECORDING MEDIUM

(71) Applicant: NEC Corporation, Tokyo (JP)

(72) Inventors: Yuka Ogino, Tokyo (JP); Keiichi Chono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 520 days.

(21) Appl. No.: 17/620,551

(22) PCT Filed: Jun. 26, 2019

(86) PCT No.: PCT/JP2019/025342
§ 371 (c)(1),
(2) Date: Dec. 17, 2021

(87) PCT Pub. No.: WO2020/261423
PCT Pub. Date: Dec. 30, 2020

(65) Prior Publication Data
US 2022/0245228 A1 Aug. 4, 2022

(51) Int. Cl.
*G06K 9/00* (2022.01)
*G06F 21/32* (2013.01)
(Continued)

(52) U.S. Cl.
CPC .............. *G06F 21/32* (2013.01); *G06V 40/16* (2022.01); *G06V 40/18* (2022.01)

(58) Field of Classification Search
CPC ........ G06F 21/32; G06V 40/16; G06V 40/18; G06V 10/16
See application file for complete search history.

(56) References Cited

U.S. PATENT DOCUMENTS

| 2004/0190758 A1 | 9/2004 | Doi et al. |
| 2005/0084179 A1 | 4/2005 | Hanna et al. |

(Continued)

FOREIGN PATENT DOCUMENTS

| JP | 2004-297518 A | 10/2004 |
| JP | 2004-343317 A | 12/2004 |

(Continued)

OTHER PUBLICATIONS

International Search Report for PCT Application No. PCT/JP2019/025342, mailed on Jul. 30, 2019.

(Continued)

Primary Examiner — Xin Jia
(74) Attorney, Agent, or Firm — Sughrue Mion, PLLC

(57) ABSTRACT

An authentication system (1) is provided with: a first imaging apparatus (3) that obtains a first image (300) used for an authentication by capturing an image of a first imaging range; a second imaging apparatus (3) that obtains a second image (200) by capturing an image of a second imaging range that is wider than the first imaging range; and a control apparatus (6) that selects a target person (Ta) for the authentication on the basis of a target area (TA) in the second image that includes a predetermined portion (TP) of a person (T) and a reference area (RA) in the second image that corresponds to the first imaging range.

8 Claims, 14 Drawing Sheets

(51) Int. Cl.
    *G06V 40/16*        (2022.01)
    *G06V 40/18*        (2022.01)

(56) References Cited

U.S. PATENT DOCUMENTS

| | | | |
|---|---|---|---|
| 2016/0094756 A1 | 3/2016 | Onishi | |
| 2017/0251366 A1* | 8/2017 | Perna | G06F 21/32 |
| 2018/0247112 A1 | 8/2018 | Norimatsu | |
| 2018/0276465 A1* | 9/2018 | Lee | G06V 40/197 |
| 2019/0089866 A1 | 3/2019 | Horishita | |

FOREIGN PATENT DOCUMENTS

| | | |
|---|---|---|
| JP | 2006-126899 A | 5/2006 |
| JP | 2006-319550 A | 11/2006 |
| JP | 2016-066241 A | 4/2016 |
| JP | 2017-045485 A | 3/2017 |
| JP | 2017-142772 A | 8/2017 |
| JP | 2017-530476 A | 10/2017 |
| JP | 2019-040642 A | 3/2019 |
| JP | 2019-057036 A | 4/2019 |

OTHER PUBLICATIONS

Extended European Search Report for EP Application No. EP19934710.5 dated on Jun. 7, 2022.

\* cited by examiner

AUTHENTICATION SYSTEM, AUTHENTICATION METHOD, CONTROL APPARATUS, COMPUTER PROGRAM AND RECORDING MEDIUM

This application is a National Stage Entry of PCT/JP2019/025342 filed on Jun. 26, 2019, the contents of all of which are incorporated herein by reference, in their entirety.

TECHNICAL FIELD

The present disclosure relates to a technical field of an authentication system, an authentication method, a control apparatus, a computer program and a recording medium that are configured to authenticate a target person.

BACKGROUND ART

An iris authentication system that performs an iris authentication by capturing an image of an iris of a target person is known as one example of an authentication system that is configured to authenticate the target person. For example, a Patent Literature 1 discloses an iris authentication that is provided with a face imaging camera and an iris imaging camera and that calculates a position of an eye of an imaging subject from an captured image of the face imaging camera and captures an iris image of the imaging subject by the iris imaging camera after making the iris imaging camera face toward the calculated position of the eye.

In addition, there are Patent Literatures 2 to 5 as a background art document relating to the present disclosure.

CITATION LIST

Patent Literature

Patent Literature 1: JP2004-297518A
Patent Literature 2: JP2004-343317A
Patent Literature 3: JP2017-530476A
Patent Literature 4: JP2017-142772A
Patent Literature 5: JP2006-319550A

SUMMARY

Technical Problem

A telephoto camera is often used as the iris imaging camera. As a result, usually, an imaging range (in other words, an angle of view) of the iris imaging camera is often narrower than an imaging range of the face imaging camera and overlaps with the imaging range of the face imaging camera at least partially. In this case, there is a possibility that the face imaging camera captures an image of a person that is undesirable to be selected as the target person for the iris authentication in addition to or instead of a person that is desirable to be selected as the target person for the iris authentication. When the face imaging camera captures the image of the person that is undesirable to be selected as the target person for the iris authentication, there is a possibility that the person that is undesirable to be selected as the target person for the iris authentication is selected as the target person for the iris authentication. As a result, such a technical problem occurs that there is a possibility that an expected iris authentication is not performed properly.

Note that there is a possibility that the above described technical problem occurs in not only the iris authentication system but also any authentication system that authenticates the person (namely, the target person) by any method.

It is therefore an example object of the present disclosure to provide an authentication system, an authentication method, a control apparatus, a computer program and a recording medium that can solve the above described technical problem. By way of example, an example object of the present disclosure is to provide an authentication system, an authentication method, a control apparatus, a computer program and a recording medium that can properly select a target person for an authentication.

Solution to Problem

One example aspect of an authentication system is provided with: a first imaging apparatus that obtains a first image used for an authentication by capturing an image of a first imaging range; a second imaging apparatus that obtains a second image by capturing an image of a second imaging range that is wider than the first imaging range; and a control apparatus that selects a target person for the authentication on the basis of a target area in the second image that includes a predetermined portion of a person and a reference area in the second image that corresponds to the first imaging range.

One example aspect of an authentication method includes: an obtaining step that obtains a second image from a second imaging apparatus that obtains the second image by capturing an image of a second imaging range that is wider than a first imaging range of a first imaging apparatus that obtains a first image used for an authentication; and a selection step that selects a target person for the authentication on the basis of a target area in the second image that includes a predetermined portion of a person and a reference area in the second image that corresponds to the first imaging range.

One example aspect of a control apparatus is provided with: an obtaining unit that obtains a second image from a second imaging apparatus that obtains the second image by capturing an image of a second imaging range that is wider than a first imaging range of a first imaging apparatus that obtains a first image used for an authentication; and a selecting unit that selects a target person for the authentication on the basis of a target area in the second image that includes a predetermined portion of a person and a reference area in the second image that corresponds to the first imaging range.

One example aspect of a computer program allows a computer to perform the one example aspect of the authentication method described above.

One example aspect of a recording medium is a recording medium on which the one example aspect of the computer program described above is recorded.

Advantageous Effects

According to the example aspect of each of the authentication system, the authentication method, the control apparatus, the computer program and the recording medium described above, it is possible to properly select the target person for then authentication.

Figure 14A:
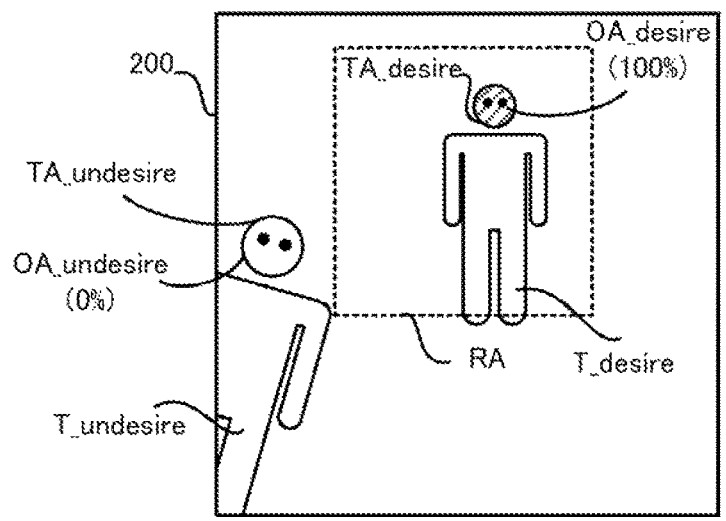
Figure 14B:
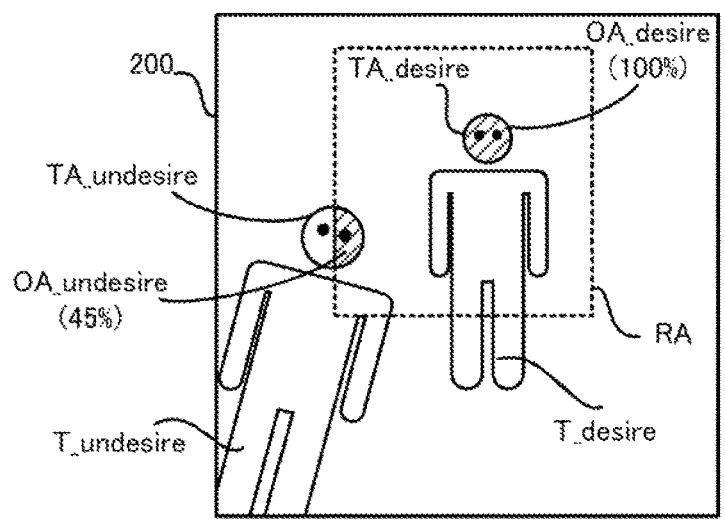
Figure 14C:
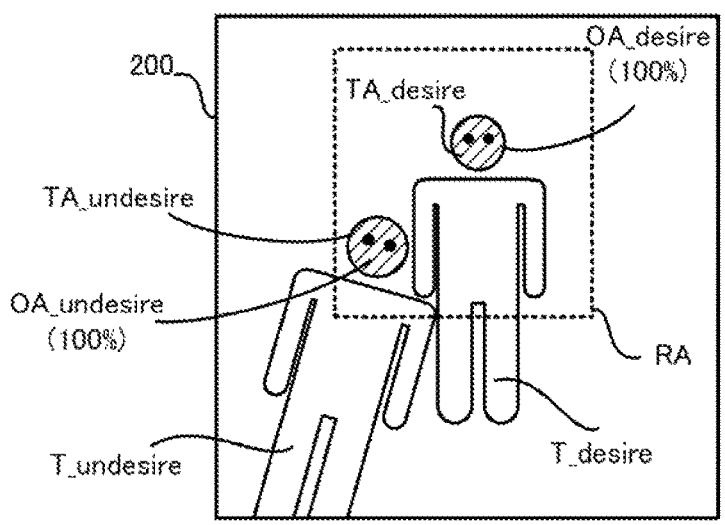

Each of FIG. 14A to FIG. 14C is a planer view that illustrates the wide image in which two persons are included.

Figure 15:
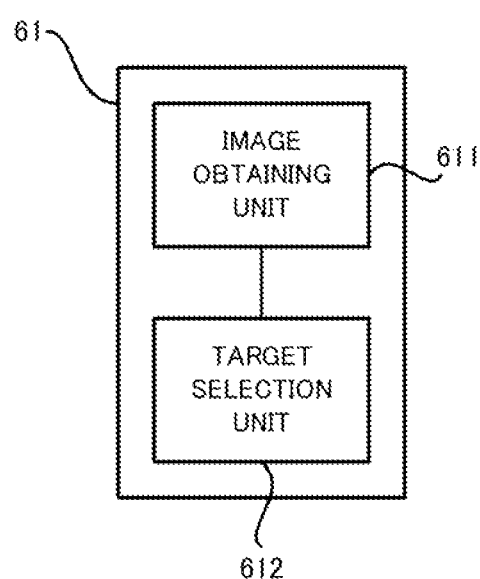

FIG. 15 is a block diagram that illustrates a modified example of the functional block implemented in the CPU of the iris authentication apparatus.

DESCRIPTION OF EXAMPLE EMBODIMENTS

Hereinafter, an example embodiment of an authentication system, an authentication method, a control apparatus, a computer program and a recording medium will be described with reference to the drawings. In the below described description, the example embodiment of the authentication system, the authentication method, the control apparatus, the computer program and the recording medium will be described by using an iris authentication system 1 that performs an iris authentication operation for performing an authentication of a person T on the basis of a pattern of an iris of the person T. The iris authentication system 1 may be used as a part of a system for automating an immigration procedure in an airport (what we call ABC (Automated Border Control)). In this case, the iris authentication system 1 may be an iris authentication system in a walk-through type that performs the authentication of moving person T. In the below described description, an example in which the iris authentication system 1 is the iris authentication system in the walk-through type will be described.

However, the iris authentication system 1 is not limited to the iris authentication system that is described in this paragraph as one example. The iris authentication system 1 may be used as any iris authentication system that is configured to perform the authentication of the person T (for example, an iris authentication system that performs the authentication of the person T that does not move or stops). Note that the iris authentication system 1 is one example of an "authentication system" in a Supplementary Note described below.

(1) Configuration of Iris Authentication System 1

(1-1) Entire Configuration of Iris Authentication System 1

Figure 1:
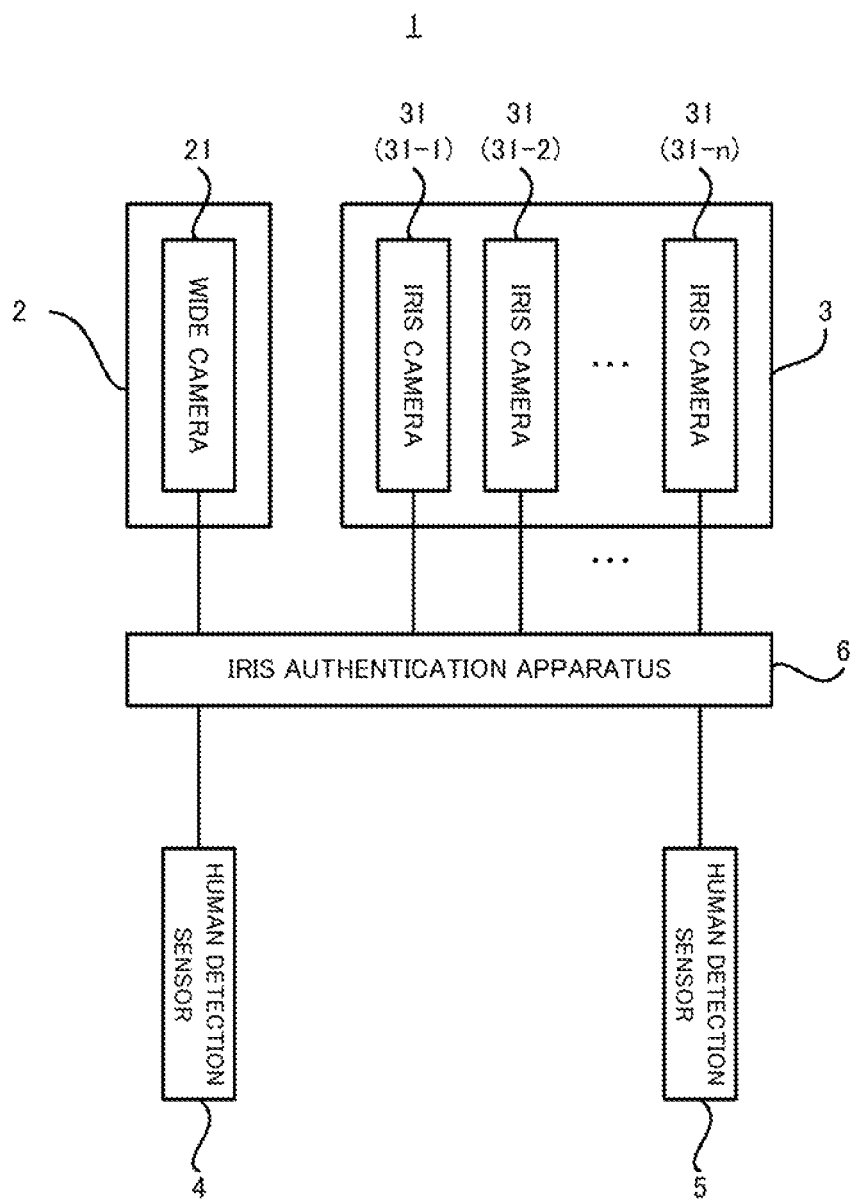
FIG. 1 is a block diagram that illustrates an entire configuration of an iris authentication system in the present example embodiment.

Firstly, with reference to FIG. 1, an entire configuration of the iris authentication system 1 in the present example embodiment will be described. FIG. 1 is a block diagram that illustrates the entire configuration of the iris authentication system 1 in the present example embodiment.

As illustrated in FIG. 1, the iris authentication system 1 is provided with: a wide imaging apparatus 2 that is one specific example of a "second imaging apparatus" in the Supplementary Note described below; a plurality of iris imaging apparatuses 3 each of which is one specific example of a "first imaging apparatuses" in the Supplementary Note described below; and an iris authentication apparatus 6 that is one specific example of a "control apparatus" in the Supplementary Note described below. The iris authentication system 1 is further provided with: a human detection sensor 4; and a human detection sensor 5.

The wide imaging apparatus 2 is provided with single (alternatively, a plurality of, in some cases) wide camera 21. The iris imaging apparatus 3 is provided with a plurality of iris cameras 31. FIG. 1 illustrates an example in which the iris imaging apparatus 3 is provided with n (note that n is an integer that is equal to or larger than 2) iris cameras 31. In the below described description, the n iris cameras 3 are referred to as an iris camera 3-1, an iris camera 3-2, ..., and an iris camera 3-$n$, respectively, if needed. Note that the number of the iris cameras 31 may be set appropriately on the basis of a characteristic of each iris camera 31 (for example, at least one of an imaging range of each iris camera 31, a resolution of each iris camera 31 and so on).

Figure 2:
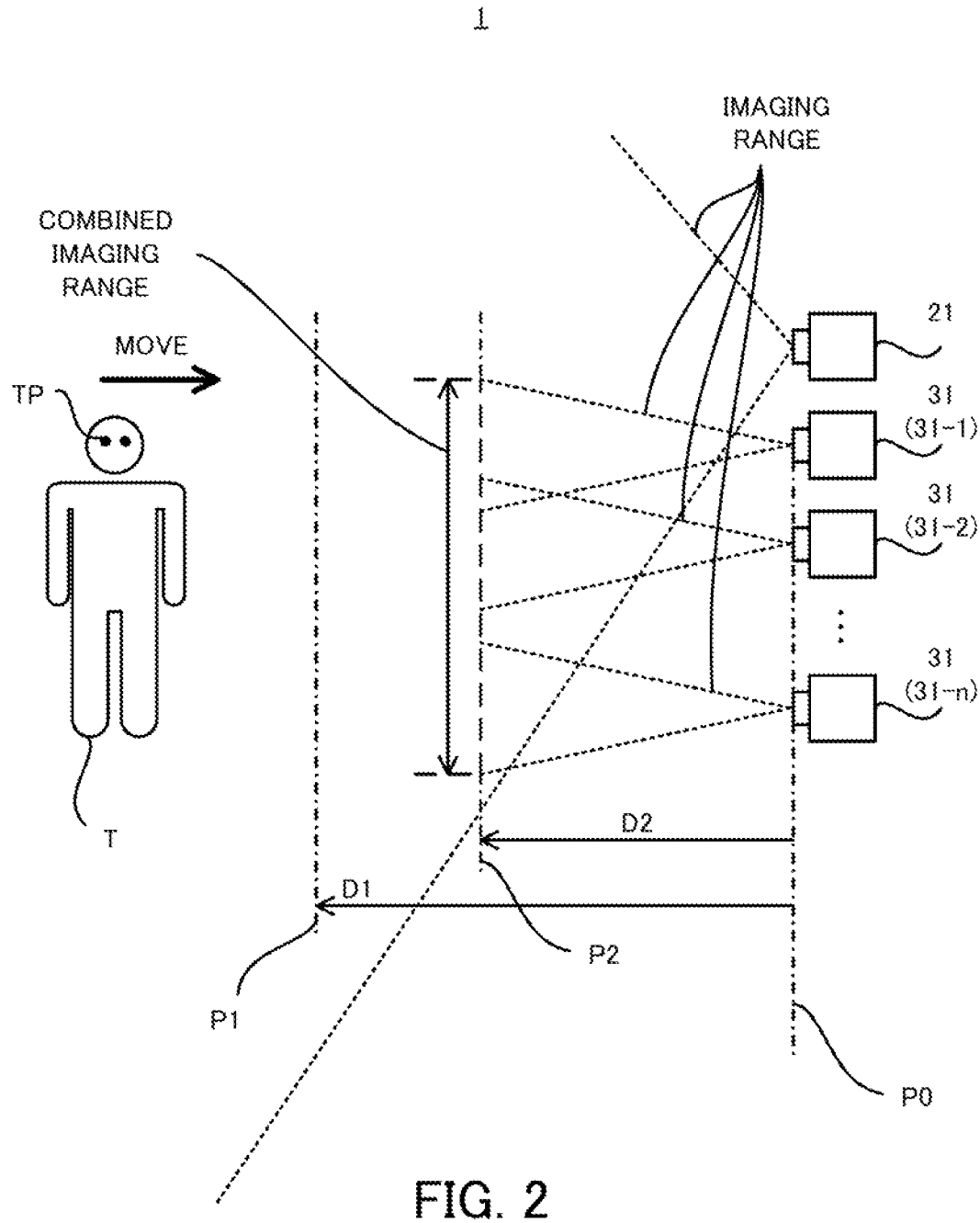
FIG. 2 is a conceptional diagram that illustrates a positional relationship between a wide camera and an iris camera and a person.

Each of the wide camera 21 and the plurality of iris cameras 31 is an imaging apparatus that is configured to capture an image of the person T. Next, with reference to FIG. 2, the wide camera 21 and the plurality of iris cameras 31 will be described in more detail. FIG. 2 is a conceptional diagram that illustrates a positional relationship between the wide camera 21 and the plurality of iris cameras 31 and the person T.

As illustrated in FIG. 2, the wide camera 21 captures the image of the person T with an imaging range that is wider than the imaging range of each iris camera 31. Namely, the imaging range of the wide camera 21 is wider than the imaging range of each iris camera 31. Specifically, the imaging range of the wide camera 21 is set to be a proper range so that the wide camera 21 is configured to capture the image of the person T regardless of the height of the person T. Namely, the imaging range of the wide camera 21 is set to be a proper range so that the wide camera 21 is configured to capture the image of the relatively tall person T and to capture the image of the relatively short person T too. Especially, the imaging range of the wide camera 21 is set to be a proper range so that the wide camera 21 is configured to capture an image of a target portion TP (an eye including the iris in the present example embodiment) of the person T that is used for the authentication.

Note that the "imaging range of the camera" in the present example embodiment means a range including a scene an image of which is capturable by the camera, and may be referred to as a range of field of view, an imaging area, an area of field of view or an area of an angle of view. A size of the imaging range typically becomes wider as an angle of view (in other word, a view angle) of the camera becomes wider. Thus, an optical system (for example, a lens) of the wide camera 21 is typically an optical system that has a field of view wider than that of an optical system of each iris camera 31. Namely, an angle of view of the wide camera 21 is wider than an angle of view of each iris camera 31. Moreover, the angle of view of the camera typically becomes wider as a focal length of an optical system (for example, a lens) of the camera becomes shorter. Thus, a focal length of the optical system of the wide camera 21 is shorter than a focal length of the optical system of each iris camera 31.

The wide camera 21 captures the image of the person T that is located at a trigger point P1. Namely, the imaging range of the wide camera 21 is set to be a proper range so that the wide camera 21 is configured to capture the image of the person T that is located at the trigger point P1. The trigger point P1 is a point that is located on a moving route of the person T. Moreover, the trigger point P1 is a point that is located at a nearer side than a reference point P0 as seen from the person T moving toward the trigger point P1. Namely, the trigger point P1 is a point that is located at a backward side (namely, a rear side) than the reference point P0 along a moving direction of the person T. Moreover, the trigger point P1 is a point that is away from the reference point P0 by a distance D1 along the moving direction of the person T. The reference point P0 may be a point at which each iris camera 31 is disposed, for example. Alternatively, the reference point P0 may be a destination for the moving person T, for example. The destination may be a point through which the person T passes after the authentication (for example, a point at which a gate is disposed in the airport).

In an example illustrated in FIG. 2, the person T moves from a left side to a right side on a paper. Therefore, in the example illustrated in FIG. 2, the trigger point P1 is a point that is away from the reference point P0 toward the left side on the paper by the distance D1. Note that the person T may move along a linear route in which the moving direction is always the same, or may move along a route (for example, a curved route or a winding route) in which the driving direction changes in the middle.

It is preferable that the wide camera 21 be disposed so that a focus position of the wide camera 21 is located at the trigger point P1. Incidentally, the "focus position" in the present example embodiment means a certain area that ranges in front and back of a best focus position (for example, an area that is allowed to be regarded as in focus and corresponds to a depth of field). In this case, it is preferable that the wide camera 21 be disposed so that the focus position of the wide camera 21 is an area including the trigger point P1 (namely, so that the trigger point P1 is located in an area corresponding to the focus position). Conversely, the trigger point P1 is set at the focus position of the wide camera 21.

The wide camera 21 has a resolution that allows a face of the person T located at the trigger point P1 to be recognized from a wide image 200 that is an image captured by the wide camera 21. Especially, the wide camera 21 has a resolution that allows a position in the wide image 200 of the target portion TP (namely, the eye) of the person T located at the trigger point P1 to be recognized from the wide image 200.

On the other hand, each iris camera 31 captures the image of the person T that is located at a focus point P2. Namely, the imaging range of each iris camera 31 is set to be a proper range so that each iris camera 31 is configured to capture the image of the person T that is located at the focus point P2. The focus point P2 is a point that is located on the moving route of the person T, as with the trigger point P1. Moreover, the pint point P2 is a point that is located at a nearer side than the reference point P0 as seen from the person T moving toward the focus point P2, as with the trigger point P1. Namely, the focus point P2 is a point that is located at a backward side (namely, a rear side) than the reference point P0 along the moving direction of the person T. Moreover, the focus point P2 is a point that is away from the reference point P0 by a distance D2 along the moving direction of the person T. In the example illustrated in FIG. 2, the person T moves from the left side to the right side on the paper. Therefore, in the example illustrated in FIG. 2, the focus point P2 is a point that is away from the reference point P0 toward the left side on the paper by the distance D2.

The distance D2 between the focus point P2 and the reference point P0 may be equal to the distance D1 between the trigger point P1 and the reference point P0. In this case, the same position is used as each of the trigger point P1 and the focus point P2. Namely, the trigger point P1 and the focus point P2 are the same positions. When the trigger point P1 is same as the focus point P2, the iris authentication system 1 is usable as the iris authentication system that performs the authentication of the person T that does not move or stops, for example.

Alternatively, the distance D2 between the focus point P2 and the reference point P0 may be shorter than the distance D1 between the trigger point P1 and the reference point P0. Thus, the focus point P2 is located at a forward side (namely, a front side) than the trigger point P1 along the moving direction of the person T. In other words, the trigger point P1 is located at a backward side (namely, a rear side) than the focus point P2 along the moving direction of the person T. Therefore, the moving person T passes through the focus point P2 after passing through the trigger point P1. In other words, the moving person T passes through the trigger point P1 before passing through the focus point P2. Note that the distances D1 and D2 may be set to be any values as long as a relationship that the distance D2 is shorter than the distance D1 is satisfied. As one example, the distances D1 and D2 may be set 3m and 2m, respectively. When the trigger point P1 is not same as the focus point P2, the iris authentication system 1 is usable as the iris authentication system in the walk-through type that performs the authentication of moving person T, for example.

Each iris camera 31 is disposed so that a focus position of each iris camera 31 is located at the focus point P2. Specifically, it can be said that each iris camera 31 is disposed so that the focus position of each iris camera 31 is an area including the focus point P2 (namely, so that the focus point P2 is located in an area corresponding to the focus position). Conversely, the focus point P2 is set at the focus position of each iris camera 31. Incidentally, since the angle of view of the wide camera 21 is wider than the angle of view of each iris camera 31 (namely, the focal length of the optical system of the wide camera 21 is shorter than the focal length of the optical system of each iris camera 31) as described above, the area corresponding to the focus position of the wide camera 21 is wider than the area corresponding to the focus position of each iris camera 31.

The plurality of iris cameras 31 are disposed so that the imaging ranges of the plurality of iris cameras 31 overlap partially in a vertical direction (alternatively, a desired direction that is different from the vertical direction) at the focus point P2. In the example illustrated in FIG. 2, the plurality of iris cameras 31 are disposed so that a lower end part of the imaging range of the iris camera 31-$k$ (note that k is an integer that satisfies $1 \le k < n$) and an upper end part of the imaging range of the iris camera 31-$m$ (note that m is an integer that satisfies $1 < k+1 = m \le n$) overlap at the focus point P2. As a result, scenes that are partially the same are included in two images respectively captured by two iris cameras 2 the imaging range of which overlap partially. In the example illustrated in FIG. 2, the same scene is included in a lower end part of the image captured by the iris camera 31-$k$ and an upper end part of the image captured by the iris camera 31-$m$.

The plurality of iris cameras 31 are disposed so that a combined imaging range that is obtained by combining the imaging ranges of the plurality of iris cameras 31 (namely, an imaging range as whole of the iris imaging apparatus 3) has a predetermined horizontal size in a horizontal direction and has a predetermined vertical size in the vertical direction. The predetermined horizontal size may be a size (for example, 0.2m) that allows the target portion TP of the person T located at the focus point P2 to be included in the combined imaging range. The predetermined vertical size may be a size (for example, 0.4m) that allows the target portion TP of the person T located at the focus point P2 to be included in the combined imaging range regardless of the height of the person T.

Each iris camera 31 has a resolution that allows the target portion TP of the person T located at the focus point P2 to be recognized from an iris image 300 that is an image captured by each iris camera 31. Especially, each iris camera 31 has a resolution that allows the pattern of the iris of the person T located at the focus point P2 to be recognized from the iris image 300 that is the image captured by each iris camera 31.

Figure 3:
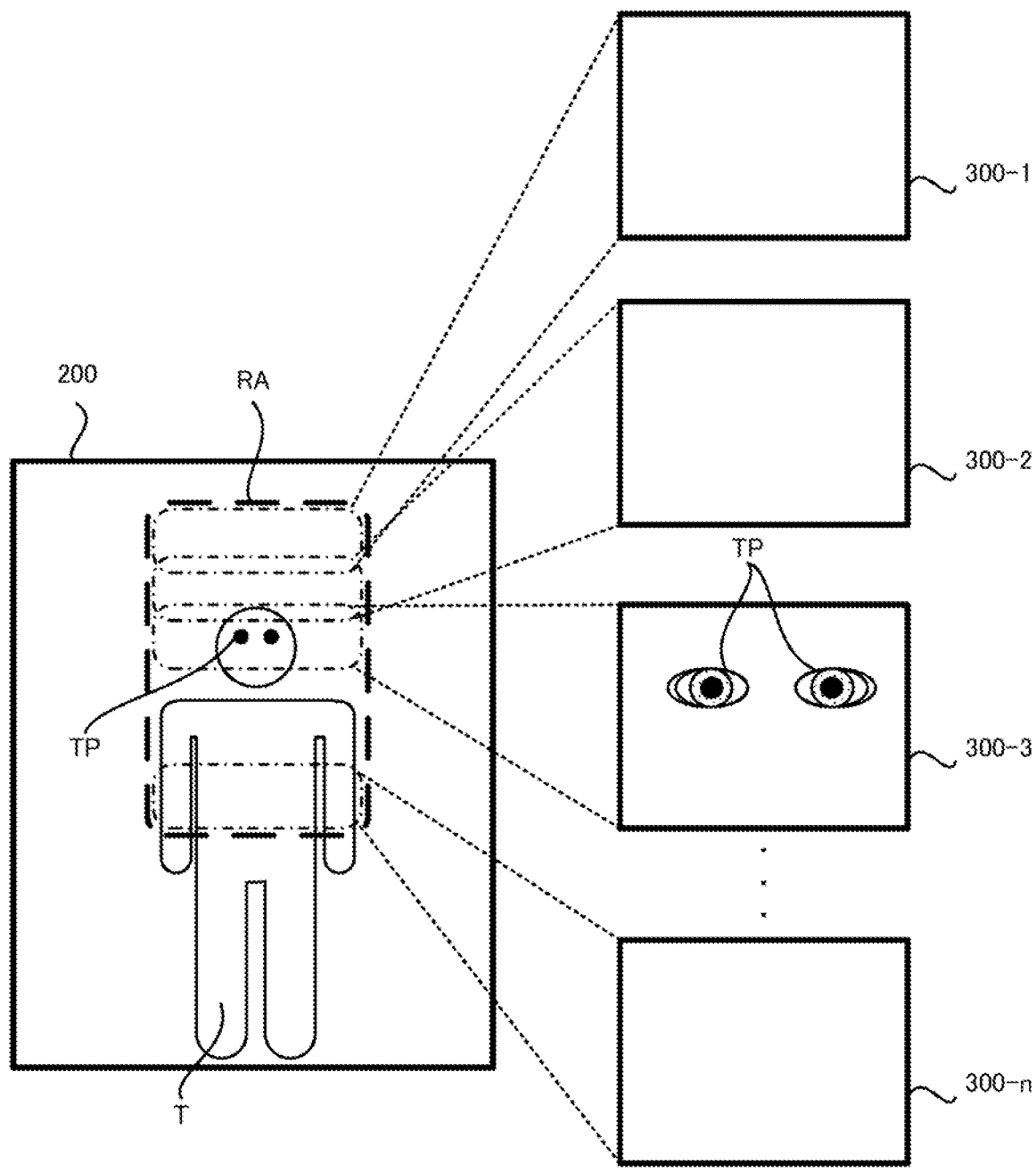
FIG. 3 is a planar view that illustrates a relationship between a wide image and a plurality of iris images.

The wide camera 21 and the plurality of iris cameras 31 are disposed so that the combined imaging range of the plurality of iris cameras 31 overlaps with the imaging range of the wide camera 21 at least partially. For example, the wide camera 21 and the plurality of iris cameras 31 are disposed so that the combined imaging range of the plurality of iris cameras 31 is included in the imaging range of the wide camera 21 at at least one of the trigger point P1 and the focus point P2 (alternatively, another point). As a result, as illustrated in FIG. 3 that is a planar view illustrating a relationship between the wide image 200 and a plurality of iris images 300, a part of the wide image 200 that is captured by the wide camera 21 includes a scene that is same as a scene included in the plurality of iris images 300 that are captured by the plurality of iris cameras 31, respectively. However, the wide camera 21 and the plurality of iris cameras 31 may not be disposed so that the combined imaging range of the plurality of iris cameras 31 overlaps with the imaging range of the wide camera 21 at least partially. Namely, the wide camera 21 and the plurality of iris cameras 31 may be disposed so that the combined imaging range of the plurality of iris cameras 31 does not overlap with the imaging range of the wide camera 21. For example, the wide camera 21 and the plurality of iris cameras 31 may be disposed so that the combined imaging range of the plurality of iris cameras 31 does not overlap with the imaging range of the wide camera 21 at both of the trigger point P1 and the focus point P2.

In this case, for example, as illustrated in FIG. 3, it can be said that the wide image 200 includes an iris image area RA. In other words, it can be said that a partial area of the wide image 200 is the iris image area RA. The iris image area RA is an area that corresponds to the combined imaging range of the plurality of iris cameras 31. The iris image area RA is an area that includes the scene that is same as the scene included in the plurality of iris images 300. As described above, the imaging ranges of the plurality of iris cameras 31 overlap partially in the vertical direction. Thus, in the iris image area RA, an area corresponding to the imaging range of the iris camera 31-1, an area corresponding to the imaging range of the iris camera 31-2, an area corresponding to the imaging range of the iris camera 31-3, . . . , and an area corresponding to the imaging range of the iris camera 31-$n$ are arranged along the vertical direction. Namely, in the iris image area RA, an area that includes the scene that is same as the scene included in the iris image 300-1 captured by the iris camera 31-1, an area that includes the scene that is same as the scene included in the iris image 300-2 captured by the iris camera 31-2, an area that includes the scene that is same as the scene included in the iris image 300-3 captured by the iris camera 31-3, . . . , and an area that includes the scene that is same as the scene included in the iris image 300-$n$ captured by the iris camera 31-$n$ are arranged along the vertical direction. Note that the target portion TP of the person T is included in the iris image 300-3. In this case, the target portion TP is included in the area of the wide image 200 (especially, the iris image area RA therein) corresponding to the imaging range of the iris camera 31-3.

Again in FIG. 1, the human detection sensor 4 is a detection apparatus for detecting whether or not the person T is located at the trigger point P1. A detected result by the human detection sensor 4 is outputted to the iris authentication apparatus 6. The detected result by the human detection sensor 4 is used as a condition to determine whether or not the wide camera 21 captures the image of the person T located at the trigger point P1.

The human detection sensor 5 is a detection apparatus for detecting whether or not the person T is located at the focus point P2. A detected result by the human detection sensor 5 is outputted to the iris authentication apparatus 6. The detected result by the human detection sensor 5 is used as a condition to determine whether or not the iris camera 31 captures the image of the person T located at the focus point P2.

The iris authentication apparatus 6 controls an entire operation of the iris authentication system 1. Especially in the present example embodiment, the iris authentication apparatus 6 performs the iris authentication operation. The iris authentication operation is an operation that includes a process of selecting one iris camera 31 for capturing the image of the person T located at the focus point P2 from the plurality of iris cameras 31 on the basis of the wide image 200 captured by the wide camera 21 and a process of performing the authentication of the person T on the basis of the iris image 300 captured by the selected one iris camera 31, for example.

(1-2) Configuration of Iris Authentication Apparatus 6

Figure 4:
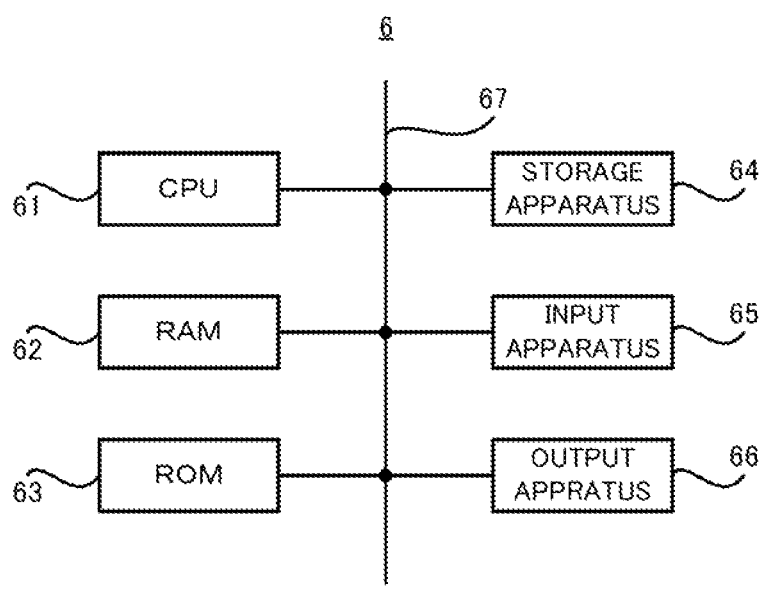
FIG. 4 is a block diagram that illustrates a hardware configuration of an iris authentication apparatus in the present example embodiment.

Next, with reference to FIG. 4, a configuration of the iris authentication apparatus 6 will be described. FIG. 4 is a block diagram that illustrates a hardware configuration of the iris authentication apparatus 6 in the present example embodiment.

As illustrated in FIG. 3, the iris authentication apparatus 6 is provided with a CPU (Central Processing Unit) 61, a RAM (Random Access Memory) 62, a ROM (Read Only Memory) 63, a storage apparatus 64, an input apparatus 65, and an output apparatus 66. The CPU 61, the RAM 62, the ROM 63, the storage apparatus 64, the input apparatus 65, and the output apparatus 66 are interconnected through a data bus 67. However, the iris authentication apparatus 6 may not be provided with at least one of the RAM 62, the ROM 63, the storage apparatus 64, the input apparatus 65, and the output apparatus 66.

The CPU 61 reads a computer program. For example, the CPU 61 may read a computer program stored in at least one of the RAM 62, the ROM 63 and the storage apparatus 64. For example, the CPU 61 may read a computer program stored in a computer-readable recording medium, by using a not-illustrated recording medium reading apparatus. The CPU 61 may obtain (namely, read) a computer program from a not-illustrated apparatus disposed outside the iris authentication apparatus 6, through a network interface. The CPU 61 controls the RAM 62, the storage apparatus 64, the input apparatus 65, and the output apparatus 66 by executing the read computer program. Especially in the present example embodiment, when the CPU 61 executes the read computer program, a logical functional block(s) for performing the iris authentication operation is implemented in the CPU 61. Namely, the CPU 61 is configured to function as a controller for implementing the logical block for performing the iris authentication operation.

Figure 5:
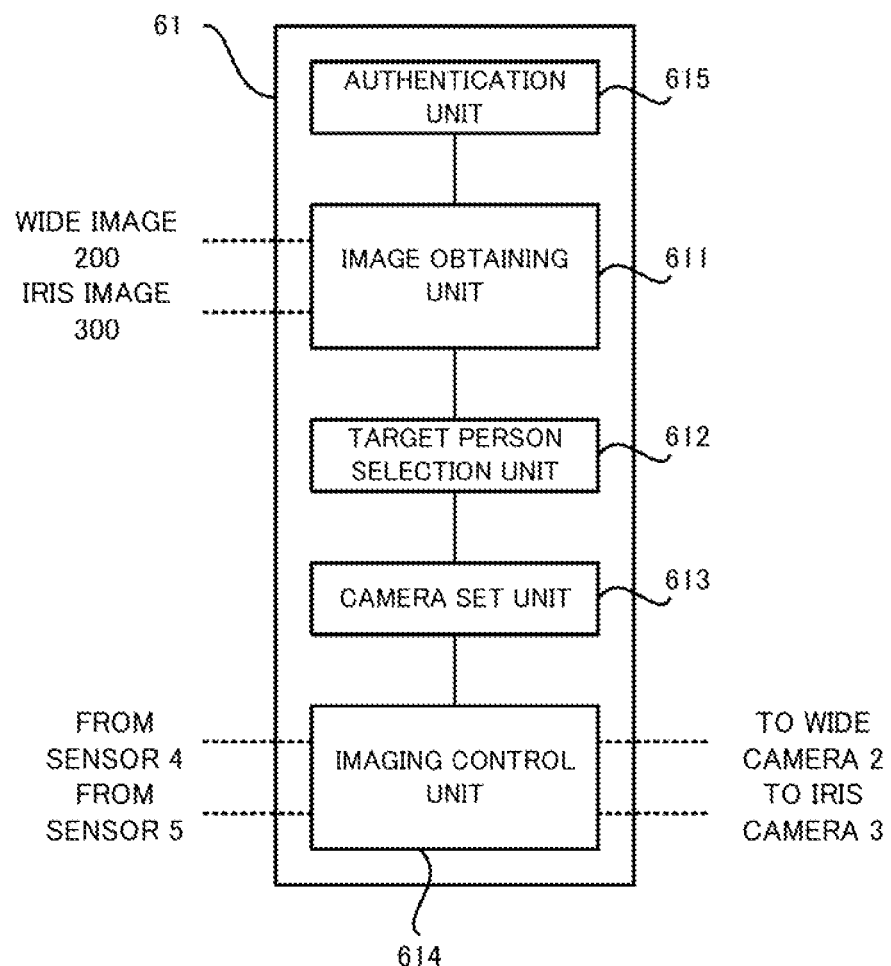
FIG. 5 is a block diagram that illustrates a functional block implemented in a CPU of the iris authentication apparatus in the present example embodiment.

One example of the logical block that is implemented in the CPU 61 for performing the iris authentication operation is illustrated in FIG. 5. As illustrated in FIG. 5, in the CPU 61, an image obtaining unit 611 that is one specific example of a "obtaining unit" in the Supplementary Note described below, a target selection unit 612 that is one specific example of a "selecting unit" in the Supplementary Note described below, a camera set unit 613, an imaging control unit 614 and an authentication unit 615 are implemented as logical blocks for performing the iris authentication operation. Note that an operation of each of the image obtaining unit 611, the target selection unit 612, the camera set unit 613, the imaging control unit 614 and the authentication unit 615 will be described later in detail with reference to FIG. 6, and thus, the detailed description thereof is omitted here.

Again in FIG. 4, The RAM 62 temporarily stores the computer program to be executed by the CPU 61. The RAM 62 temporarily stores the data that is temporarily used by the CPU 61 when the CPU 61 executes the computer program. The RAM 62 may be, for example, a D-RAM (Dynamic RAM).

The ROM 63 stores the computer program to be executed by the CPU 61. The ROM 63 may otherwise store fixed data. The ROM 63 may be, for example, a P-ROM (Programmable ROM).

The storage apparatus 64 stores the data that is stored for a long term by the iris authentication apparatus 6. The storage apparatus 64 may operate as a temporary storage apparatus of the CPU 61. The storage apparatus 64 may include, for example, at least one of a hard disk apparatus, a magneto-optical disk apparatus, an SSD (Solid State Drive), and a disk array apparatus.

The input apparatus 65 is an apparatus that receives an input instruction from a user of the iris authentication apparatus 6. The input apparatus 65 may include, for example, at least one of a keyboard, a mouse, and a touch panel.

The output apparatus 66 is an apparatus that outputs an information about the iris authentication apparatus 6, to the outside. For example, the output apparatus 66 may be a display apparatus that is configured to display an information about the iris authentication apparatus 6.

(2) Flow of Iris Authentication Operation

Figure 6:
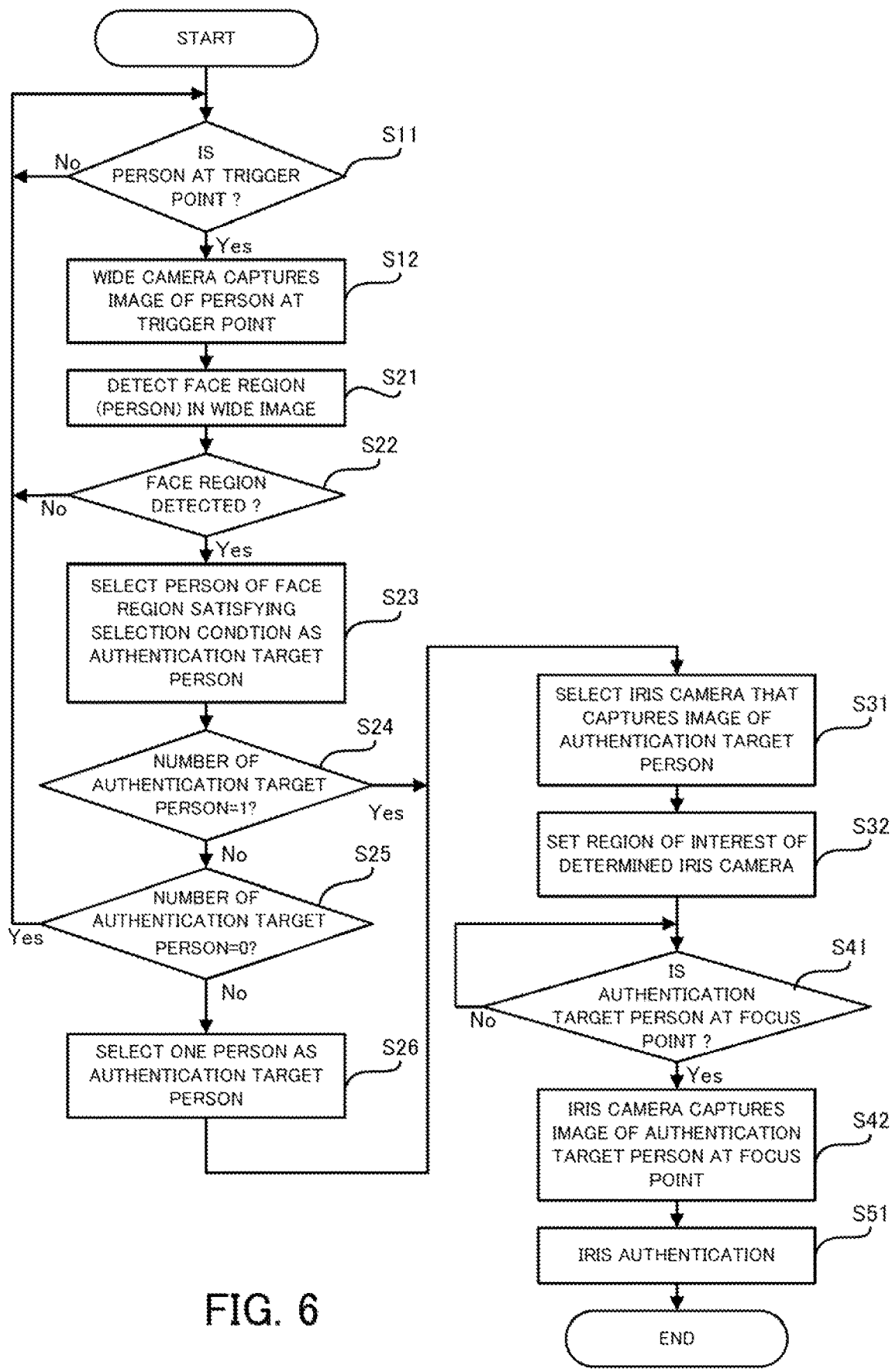
FIG. 6 is a flow chart that illustrates a flow of an operation of the iris authentication system (namely, an iris authentication operation) in the present example embodiment.

Next, with reference to FIG. 6, a flow of the operation (namely, the iris authentication operation) of the iris authentication system 1 in the present example embodiment will be described. FIG. 6 is a flow chart that illustrates the flow of the operation (namely, the iris authentication operation) of the iris authentication system 1 in the present example embodiment.

As illustrated in FIG. 6, the imaging control unit 614 determines whether or not the person T is located at the trigger point P1 on the basis of the detected result by the human detection sensor 4 (a step S11). As a result of the determination at the step S11, when it is determined that the person T is not located at the trigger point P1 (the step S11: No), the process at the step S11 is repeatedly performed. On the other hand, as a result of the determination at the step S11, when it is determined that the person T is located at the trigger point P1 (the step S11: Yes), the imaging control unit 614 controls the wide camera 21 to capture the image of the person T located at the trigger point P1 (a step S12). As a result, the wide camera 21 captures the image of the person T located at the trigger point P1 (the step S12). The wide image 200 captured by the wide camera 21 is obtained by the image obtaining unit 611 (the step S12).

Then, the target selection unit 612 selects, as an authentication target person Ta for which the iris authentication should be performed, at least one of person(s) T included in the wide image 200 on the basis of the obtained at the step S12 (a step S21 to a step S27).

In order to select the authentication target person Ta, the target selection unit 612 detects a target area TA that includes the target portion TP in the wide image 200 on the basis of the obtained at the step S12 (a step S21). As described above, the eye of the person T is used as the target portion TP in the present example embodiment. Thus, the target selection unit 612 detects the target area TA that includes the eye of the person T that is the target portion TP in the wide image 200. In the below described description, it is assumed that the target selection unit 612 selects a face area including a face of the person T as the target area TA including the eye of the person T for convenience of description. Therefore, in the below described description, the target area TA is referred to as the "face area TA" for convenience of description. The face area TA may be an area in which only the face is included. Namely, the face area TA may be an area that is distinguished from surrounding part by an outline of the face (in other words, that is extractable by the outline of the face). Alternatively, the face area TA may be a predetermined-shaped (for example, a rectangular) area in which not only the face but also a scene around the face are included. Note that the target selection unit 612 may use an existing method for detecting an area in which a desired object is included in a certain image as a method for detecting the face area TA. Thus, a detailed description of the method for detecting the face area TA is omitted.

Then, the target selection unit 612 determines whether or not the face area TA is actually detected at the step S21 (a step S22).

As a result of the determination at the step S22, when it is determined that the face area TA is not detected at the step S21 (the step S22: No), it is estimated that the person T is not included in the wide image 200 obtained at the step S21. In this case, the iris authentication apparatus 6 repeats the process after the step S11 without selecting the authentication target person Ta.

On other hand, as a result of the determination at the step S22, when it is determined that the face area TA is detected at the step S21 (the step S22: Yes), the target selection unit 612 selects, as the authentication target person Ta, the person T that is included in the wide image 200 obtained at the step S12 and that corresponds to the face area TA satisfying a predetermined selection condition (a step S23). Namely, the target selection unit 612 does not select, as the authentication target person Ta, the person T corresponding to the face area TA that does not satisfy the predetermined selection condition among the person(s) T included in the wide image 200.

The predetermined selection condition may include a condition based on the face area TA and the iris image area RA. In this case, it can be said that the target selection unit 612 selects the authentication target person Ta on the basis of the face area TA and the iris image area RA. Specifically, the predetermined selection condition may include a condition based on a positional relationship between the face area TA and the iris image area RA. In this case, it can be said that the target selection unit 612 selects the authentication target person Ta on the basis of the positional relationship between the face area TA and the iris image area RA.

In this case, in order to select the person T that corresponds to the face area TA satisfying the selection condition as the authentication target person Ta, the target selection unit 612 determines the iris image area RA. Specifically, the iris image area RA corresponds to an area that is obtained by projection the imaging range of the iris camera 31 at the focus point P2 on a virtual optical plane that is located at the trigger point P1 (substantially, the imaging range of the wide camera 21 at the trigger point P1, and the wide image 200). A relationship between the iris image 300 and the wide image 200 (especially, a relationship between the iris image 300 and the iris image area RA) is represented by a transformation matrix H (typically, a homography) that represents a correlation between the imaging range (namely, the angle of view) of the iris camera 31 and the imaging range (namely, the angle of view) of the wide camera 21. Specifically, a coordinate p_wt in the wide image 200 that corresponds to any coordinate p_if in the iris image 300 is determinable by an equation of p_wf=H×p_if. Note that any coordinate p_if in the iris image 300 is equivalent to any coordinate in the imaging range of the iris camera 31 at the focus point P2. Moreover, the coordinate in the wide image 200 is a coordinate in the imaging range of the wide camera 21 at the trigger point P1 and is typically equivalent to a coordinate in the iris image area RA. Moreover, when the trigger point P1 is same as the focus point P2, a transformation matrix H_iwf that represents a correlation between the imaging range of the iris camera 31 at the focus point P2 and the imaging range of the wide camera 21 at the focus point P2 is used as the transformation matrix H. On the other hand, when the trigger point P1 is not same as the focus point P2, a matrix that is obtained by multiplying the above described transformation matrix H_iwf by a transformation matrix H_wft that represents a correlation between the imaging range of the wide camera 21 at the focus point P2 and the imaging range of the wide camera 21 at the trigger point P1 (namely, H_iwf×H_wft) is used at the transformation matrix H. After determining the iris image area RA in this manner, the target selection unit 612 determines whether or not the selection condition based on the positional relationship between the face area TA and the iris image area RA is satisfied for each detected face area FA.

An overlapping condition based on an overlapping degree of the face area TA and the iris image area RA is one example of the condition based on the positional relationship between the face area TA and the iris image area RA. In this case, it can be said that the target selection unit 612 selects the authentication target person Ta on the basis of the overlapping degree of the face area TA and the iris image area RA. For example, the target selection unit 612 may select, as the authentication target person Ta, the person T that corresponds to the face area TA that has the relatively high overlapping degree with the iris image area RA. For example, the target selection unit 612 may not select, as the authentication target person Ta, the person T that corresponds to the face area TA that has the relatively low overlapping degree with the iris image area RA.

The overlapping condition may be a condition based on an overlapping area OA in the face area TA that overlaps with the iris image area RA, for example. More specifically, the overlapping condition may be a condition based on a ratio of the overlapping area OA to the face area TA. In this case, the overlapping condition may be a condition that the ratio of the overlapping area OA to the face area TA is larger than a predetermined first threshold value. As a result, the person T that corresponds to the face area TA having the overlapping area OA the ratio of which is larger than the first threshold value is selected as the authentication target person Ta. On the other hand, the person T that corresponds to the face area TA having the overlapping area OA the ratio of which is not larger than the first threshold value is not selected as the authentication target person Ta.

Here, with reference to FIG. 7A and FIG. 7B, one specific example of each of the authentication target person Ta that is selected on the basis of the overlapping condition and the authentication target person Ta that is not selected on the basis of the overlapping condition will be described. Specifically, as illustrated in FIG. 7A, an example in which three person T (specifically, a person T #11, a person T #12 and a person T #13) are included in the wide image 200 will be described.

Figure 7A:
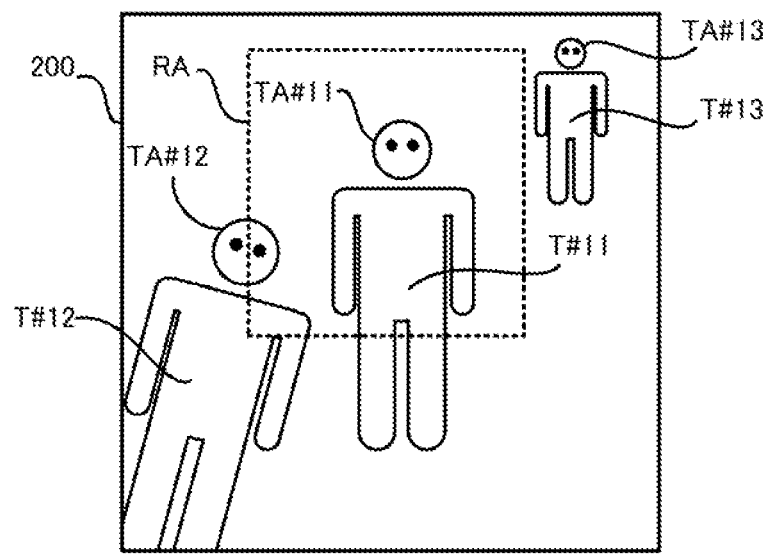
FIG. 7A is a planar view that illustrates the wide image in which three persons are included and FIG. 7B is a planar view that illustrates a positional relationship between face areas illustrated in FIG. 7A and an iris image area.

In an example illustrated in FIG. 7A, the person T #11 is included in the wide image 200 so that whole of the face is included in the iris image area RA. The person T #12 is included in the wide image 200 so that a part of the face is included in the iris image area RA and a residual part of the face is not included in (namely, is beyond) the iris image area RA. The person T #13 is included in the wide image 200 so that whole of the face is not included in the iris image area RA.

Figure 7B:
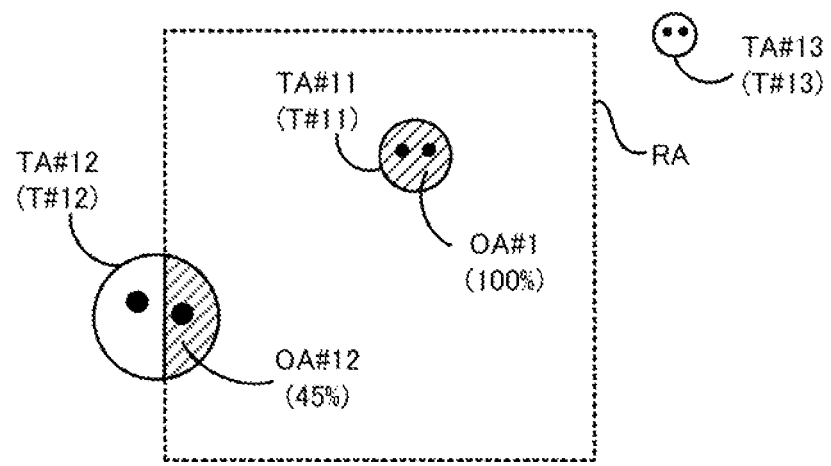

In this case, as illustrated in FIG. 7B that is a planar view illustrating the positional relationship between the face area TA and the iris image area RA, whole of the face area TA #11 of the person T #11 is included in the iris image area RA. Thus, an overlapping area OA #11 of the person T #11 is same as the face area TA #11. Therefore, the ratio of the overlapping area OA #11 to the face area TA #11 is 100%.

Moreover, as illustrated in FIG. 7B, a part of the face area TA #12 of the person T #12 is included in the iris image area RA. Thus, an overlapping area OA #12 of the person T #12 is same as a part of the face area TA #12. Therefore, the ratio of the overlapping area OA #12 to the face area TA #12 is smaller than 100% and larger than 0%. In an example illustrated in FIG. 7B, the ratio of the overlapping area OA #12 to the face area TA #12 is 45%.

Moreover, as illustrated in FIG. 7B, whole of the face area TA #13 of the person T #13 is not included in the iris image area RA. Thus, an overlapping area OA #13 of the person T #13 does not exist. Therefore, the ratio of the overlapping area OA #13 to the face area TA #13 is 0%.

When the first threshold value is set to be 60% in this situation illustrated in FIG. 7B, the person T #11 that corresponds to the face area TA #11 having the overlapping area OA the ratio of which is larger than 60% is selected as the authentication target person Ta. On the other hand, the persons T #12 and T #13 that correspond to the face areas TA #12 and TA #13, respectively, having the overlapping area OA the ratio of which is not larger than 60% is not selected as the authentication target person Ta.

A ratio of the face area TA included in the iris image area RA becomes larger as the ratio of the overlapping area OA becomes larger. There is higher possibility that at least one of the plurality of iris cameras 31 properly captures the image of the face (especially, the target portion TP) of the person T as the ratio of the face area TA included in the iris image area RA becomes larger. Thus, it can be said that the overlapping condition is a condition for selecting, as the authentication target person Ta, the person T the image of the face (especially, the target portion TP) of which is able to be properly captured by at least one of the plurality of iris cameras 31. Namely, when the overlapping condition is used, the target selection unit 612 can properly select, as the authentication target person Ta, the person T the image of the face (especially, the target portion TP) of which is able to be properly captured by at least one of the plurality of iris cameras 31.

Note that the first threshold value used by the overlapping condition is set to be a proper value that allows the person T that is desirable to be selected as the authentication target person Ta to be properly distinguished from the person T that is undesirable to be selected as the authentication target person Ta by the ratio of the overlapping area OA. This first threshold value may be set on the basis of a result of the iris authentication operation (especially, an operation for selecting the authentication target person Ta) that has been actually performed, an experiment or a simulation. At least one of any value that is equal to or larger than 50%, any value that is equal to or larger than 60%, any value that is equal to or larger than 70%, any value that is equal to or larger than 80%, any value that is equal to or larger than 90% and 100% is one example of the first threshold value.

A proximity condition based on a proximity degree of the face area TA and the iris image area RA is another example of the condition based on the positional relationship between the face area TA and the iris image area RA. In this case, it can be said that the target selection unit 612 selects the authentication target person Ta on the basis of the proximity degree of the face area TA and the iris image area RA. For example, the target selection unit 612 may select, as the authentication target person Ta, the person T that corresponds to the face area TA that has the relatively high proximity degree with the iris image area RA. For example, the target selection unit 612 may not select, as the authentication target person Ta, the person T that corresponds to the face area TA that has the relatively low proximity degree with the iris image area RA.

The proximity condition may be a condition based on a proximity degree of a feature point of the face area TA and a feature point of the iris image area RA, for example. Namely, the proximity condition may be a condition based on a distance D is between the feature point of the face area TA and the feature point of the iris image area RA, for example. In this case, the proximity condition may be a condition that the distance Dis is shorter than a predetermined second threshold value. As a result, the person T that corresponds to the face area TA having the feature point the distance Dis to which from the feature point of the iris image area RA is shorter the second threshold value is selected as the authentication target person Ta. On the other hand, the person T that corresponds to the face area TA having the feature point the distance Dis to which from the feature point of the iris image area RA is not shorter the second threshold value is not selected as the authentication target person Ta.

In the present example embodiment, the distance Dis means a distance in a direction that intersects with the direction (for example, the vertical direction) in which the imaging ranges of the plurality of iris cameras 31 area arranged. Typically, the distance Dis means a distance in a direction (for example, the horizontal direction) that is perpendicular to the direction (for example, the vertical direction) in which the imaging ranges of the plurality of iris cameras 31 area arranged.

The feature point is a barycenter (namely, a geometric center), for example. However, the feature point may be a point that is different from the barycenter. For example, when the face area TA and the iris image area RA have a shape that is symmetrical about a point, the feature point may be a center of symmetry.

Figure 8A:
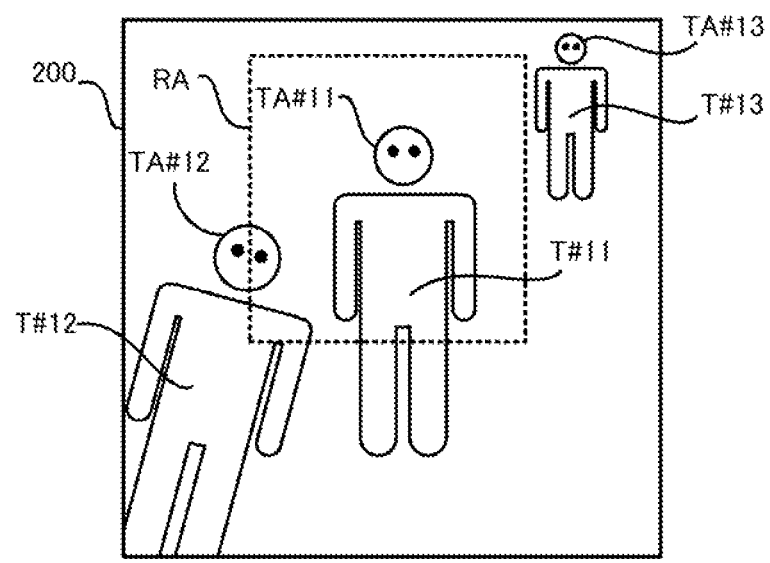
FIG. 8A is a planar view that illustrates the wide image in which three persons are included and FIG. 8B is a planar view that illustrates a positional relationship between the face areas illustrated in FIG. 8A and the iris image area.

Here, with reference to FIG. 8A and FIG. 8B, one specific example of each of the authentication target person Ta that is selected on the basis of the proximity condition and the authentication target person Ta that is not selected on the basis of the proximity condition will be described. Specifically, as illustrated in FIG. 8A, an example in which three person T (specifically, the person T #11 to the person T #13 illustrated in FIG. 7A) are included in the wide image 200 will be described.

Figure 8B:
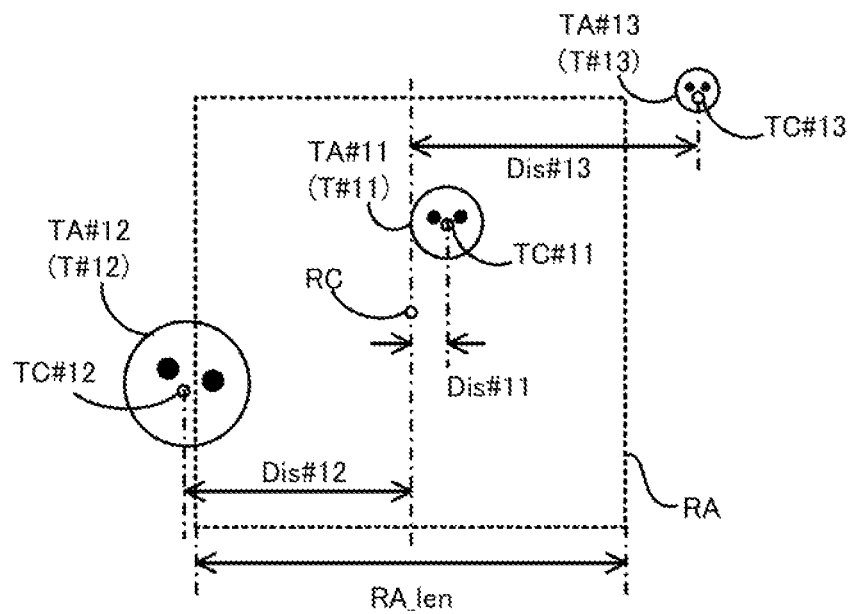

In this case, as illustrated in FIG. 8B that is a planar view illustrating a positional relationship between a barycenter TC of the face area FA and a barycenter RC of the iris image area RA, a distance Dis #11 between a barycenter TC #11 of the face area FA #11 and the barycenter RC of the iris image area RA is shorter than a distance Dis #12 between a barycenter TC #12 of the face area FA #12 and the barycenter RC of the iris image area RA and a distance Dis #13 between a barycenter TC #13 of the face area FA #13 and the barycenter RC of the iris image area RA. This is because whole of the face of the person T #11 is included in the iris image area RA and thus the barycenter TC #11 must be closer to the barycenter RC than the barycenter TC #12 and the barycenter TC #13. Moreover, the distance Dis #12 between the barycenter TC #12 of the face area FA #12 and the barycenter RC of the iris image area RA is shorter than the distance Dis #13 between the barycenter TC #13 of the face area FA #13 and the barycenter RC of the iris image area RA. This is because a part of the face of the person T #12 is included in the iris image area RA and thus the barycenter TC #12 must be closer to the barycenter RC than the barycenter TC #13 of the face area TA #13 that is not included in the iris image area RA at all.

When the second threshold value is set to be a value that is longer than the distance Dis #11 and that is shorter than the distance Dis #12 in this situation illustrated in FIG. 8B, the person T #11 that corresponds to the face area TA #11 having the barycenter TC #11 the distance to which from the barycenter RC is shorter the second threshold value is selected as the authentication target person Ta. On the other hand, the persons T #12 and T #13 that correspond to the face areas TA #12 and TA #13, respectively, having the barycenters TC #12 and TC #13 the distance to which from the barycenter RC is not shorter the second threshold value is not selected as the authentication target person Ta.

There is a higher possibility that at least a part of the face area TA is beyond the iris image area RA as the distance Dis between the barycenter TC of the face area TA and the barycenter RC of the iris image area RA becomes shorter. Namely, there is a higher possibility that the face area TA is located near the barycenter RC of the iris image area RA as the distance Dis between the barycenter TC of the face area TA and the barycenter RC of the iris image area RA becomes shorter. As a result, the ratio of the face area TA included in the iris image area RA becomes larger as the distance Dis between the barycenter TC of the face area TA and the barycenter RC of the iris image area RA becomes shorter. Thus, it can be said that the proximity condition is a condition for selecting, as the authentication target person Ta, the person T the image of the face (especially, the target portion TP) of which is able to be properly captured by at least one of the plurality of iris cameras 31, as with the overlapping condition. Namely, when the proximity condition is used, the target selection unit 612 can properly select, as the authentication target person Ta, the person T the image of the face (especially, the target portion TP) of which is able to be properly captured by at least one of the plurality of iris cameras 31.

Note that the second threshold value used by the proximity condition is set to be a proper value that allows the person T that is desirable to be selected as the authentication target person Ta to be properly distinguished from the person T that is undesirable to be selected as the authentication target person Ta by the distance Dis. This second threshold value may be set on the basis of a result of the iris authentication operation (especially, an operation for selecting the authentication target person Ta) that has been actually performed, an experiment or a simulation. The second threshold value may be set on the basis of a length RA_len of the iris image area RA. Specifically, the second threshold value may be set on the basis of the length RA_len of the iris image area RA along the direction of the distance Dis. Namely, the second threshold value may be set on the basis of the length RA_len of the iris image area RA along the direction (for example, the horizontal direction) that intersects with the direction (for example, the vertical direction) in which the imaging ranges of the plurality of iris cameras 31 area arranged. In an example illustrated in FIG. 8B, the length RA_len is a length of the iris image area RA in a left-right direction on the paper (namely, a horizontal direction). As one example, the second threshold value may be set to be a value that is obtained by multiplying the length RA_len of the iris image area RA by a coefficient (for example, 0.5) that is smaller than 1.

Again in FIG. 6, then, the target selection unit 612 determines whether or not the number of the authentication target person Ta selected at the step S23 is 1 (a step S24). Namely, the target selection unit 612 determines whether or not the number of the face area TA satisfying the selection condition is 1 (the step S24).

As a result of the determination at the step S24, when it is determined that the number of the authentication target person Ta selected at the step S23 is not 1 (namely, the number of the face area TA satisfying the selection condition is not 1) (the step S24: No), the target selection unit 612 determines whether or not the number of the authentication target person Ta selected at the step S23 is 0 (a step S25). Namely, the target selection unit 612 determines whether or not the number of the face area TA satisfying the selection condition is 0 (the step S25).

As a result of the determination at the step S25, when it is determined that the number of the authentication target person Ta selected at the step S23 is 0 (namely, the number of the face area TA satisfying the selection condition is 0) (the step S25: Yes), it is estimated that the person T included in the wide image 200 is not selected as the authentication target person Ta. In this case, the iris authentication system 1 cannot perform the iris authentication, because the authentication target person Ta is not selected. Therefore, in this case, the iris authentication apparatus 6 repeats the process after the step S11 without selecting the authentication target person Ta.

On the other hand, as a result of the determination at the step S25, when it is determined that the number of the authentication target person Ta selected at the step S23 is not 0 (namely, the number of the face area TA satisfying the selection condition is not 0) (the step S25: No), it is estimated that each of two or more persons T is selected as the authentication target person Ta at the step S23. Namely, it is estimated that the number of the face area TA satisfying the selection condition is equal to or larger than 2. In this case, the target selection unit 612 selects, as the actual authentication target person Ta, either one of two or more persons T that are selected as the authentication target persons Ta at the step S23 (a step S26). Namely, the target selection unit 612 selects, as the actual authentication target person Ta, the person T that corresponds to either one of two or more face areas TA satisfying the selection condition (the step S26).

For example, the target selection unit 612 may select one person T that is located at the front as the actual authentication target person Ta. Specifically, the target selection unit 612 may determine, as one person T that is located at the front, one person T in which an interval between both eyes is the longest, and selects, as the actual authentication target person Ta, the determined person T. For example, the target selection unit 612 may select, as the actual authentication target person Ta, one person T that corresponds to the face area TA having the highest overlapping degree with the iris image area RA. For example, the target selection unit 612 may select, as the actual authentication target person Ta, one person T that corresponds to the face area TA having the overlapping area OA the ratio of which is the largest. For example, the target selection unit 612 may select, as the actual authentication target person Ta, one person T that corresponds to the face area TA having the highest proximity degree with the iris image area RA. For example, the target selection unit 612 may select, as the actual authentication target person Ta, one person T that corresponds to the face area TA having the feature point the distance Dis to which from the feature point of the iris image area RA is the shortest.

Note that such a condition that the ratio of the overlapping area OA to the face area TA is the largest may be used as the overlapping condition instead of the condition that the ratio of the overlapping area OA to the face area TA is larger than the first threshold value, from a viewpoint of limiting the authentication target person Ta to one. Similarly, such a condition that the distance Dis is the shortest may be used as the proximity condition instead of the condition that the distance Dis is shorter than the second threshold value.

As a result of the determination at the step S24, when it is determined that the number of the authentication target person Ta selected at the step S23 is 1 (namely, the number of the face area TA satisfying the selection condition is 1) (the step S24: Yes), the processes from the step S25 to the step S26 may not be performed.

Then, the camera set unit 613 selects one iris camera 31 for capturing the image of the authentication target person Ta located at the focus point P2 from the plurality of iris cameras 31 (a step S31). Specifically, the camera set unit 613 determines one image range that includes the target portion TP of the authentication target person Ta from the plurality of imaging ranges that correspond to the plurality of iris cameras 31, respectively (namely, the plurality of imaging ranges in the iris image area RA), on the basis of the wide image 200. As a result, the camera set unit 613 determines the iris camera 31 that corresponds to the determined imaging range as one iris camera 31 for capturing the image of the authentication target person Ta. In the example illustrated in FIG. 3, the camera set unit 613 selects the iris camera 31-3 as one iris camera 31 for capturing the image of the authentication target person Ta.

Figure 9:
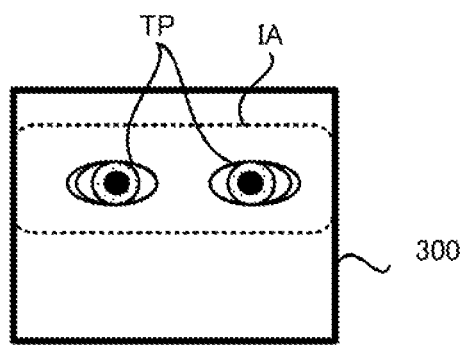
FIG. 9 is a planar view that illustrates the iris image.

Then, the camera set unit 613 sets a region of interest (ROI: Region of Interest) IA that defines an image part, which is actually obtained (namely, read) for performing the iris authentication, of the iris image 300 captured by one iris camera 31 selected at the step S31 (a step S32). Specifically, as illustrated in FIG. 9 that is a planar view illustrating the iris image 300 captured by selected one iris camera 31, the camera set unit 613 sets, to the region of interest IA, a rectangular (alternatively, another shaped) area, in which the target portion TP is expected to be included, of the iris image 300 captured by selected one iris camera 31.

When the region of interest IA is set, the iris authentication system 1 operates in a region of interest mode. In this case, the image obtaining unit 611 obtains an image part of the iris image 300 (namely, a part of image data of the iris image 300) in the region of interest IA, instead of obtaining whole of the iris image 300 captured by the iris camera 31. Namely, the image obtaining unit 611 may not obtain an image part of the iris image 300 (namely, a residual part of the image data of the iris image 300) in an area other than the region of interest IA. As a result, a frame rate at which the image obtaining unit 611 obtains the iris image 300 from the iris camera 31 substantially improves, compared to a case where whole of the iris image 300 is obtained. For example, when a half area of the iris image 300 is set to the region of interest IA, the frame rate improves to be the double, compared to a case where whole of the iris image 300 is obtained. Thus, even when the frame rate of the iris camera 31 itself is lower than a frame rate that is necessary for the iris authentication, the image obtaining unit 611 is able to obtain the iris image at the frame rate that is necessary for the iris authentication.

Then, the imaging control unit 614 determines whether or not the authentication target person Ta (namely, the person Ta that is selected as the authentication target person Ta) is located at the focus point P2 on the basis of the detected result by the human detection sensor 5 (a step S41). As a result of the determination at the step S41, when it is determined that the authentication target person Ta is not located at the focus point P2 (the step S41: No), the process at the step S41 is repeatedly performed. On the other hand, as a result of the determination at the step S41, when it is determined that the authentication target person Ta is located at the focus point P2 (the step S41: Yes), the imaging control unit 614 controls one iris camera 31 selected at the step S31 to capture the image of the authentication target person Ta located at the focus point P2 (a step S42). As a result, the selected one iris camera 31 captures the image of the authentication target person Ta located at the focus point P2 (the step S42). The iris image 300 captured by the selected one iris camera 31 (especially, the image part of the iris image 300 in the region of interest IA) is obtained by the image obtaining unit 611 (the step S42).

Then, the authentication unit 615 performs the iris authentication by using the iris image 300 obtained at the step S42 (a step S51). For example, the authentication unit 615 determines the patter of the iris of the authentication target person Ta on the basis of the iris image 300 obtained at the step S42. Then, the authentication unit 615 determines whether or not the determined pattern matches a pattern that is registered in a database stored in the storage apparatus 64 and the like. When the determined pattern matches the pattern registered in the database, the authentication unit 615 determines that the authentication target person Ta is a proper person. When the determined pattern matches the pattern registered in the database, the authentication unit 615 determines that the authentication target person Ta is not a proper person.

(3) Technical Effect of Iris Authentication System 1

As described above, the iris authentication system 1 can properly select (in other words, designate or determine) the authentication target person Ta. Especially, the iris authentication system 1 can properly select one person T of the plurality of persons T as the authentication target person Ta in a situation where the plurality of person T are included in the wide image 200 (especially, the iris image area RA thereof). In other words, the iris authentication system 1 can properly select, as the authentication target person Ta, one person T that corresponds to one face area TA satisfying the selection condition among the plurality of face areas TA in a situation where the plurality of face areas TA are detected in the wide image 200 (especially, the iris image area RA thereof). Namely, the iris authentication system 1 can select, as the authentication target person Ta, the person T that is desirable to be selected as the authentication target person Ta. In other words, the iris authentication system 1 is not likely to select, as the authentication target person Ta, the person T that is undesirable to be selected as the authentication target person Ta.

Figure 10A:
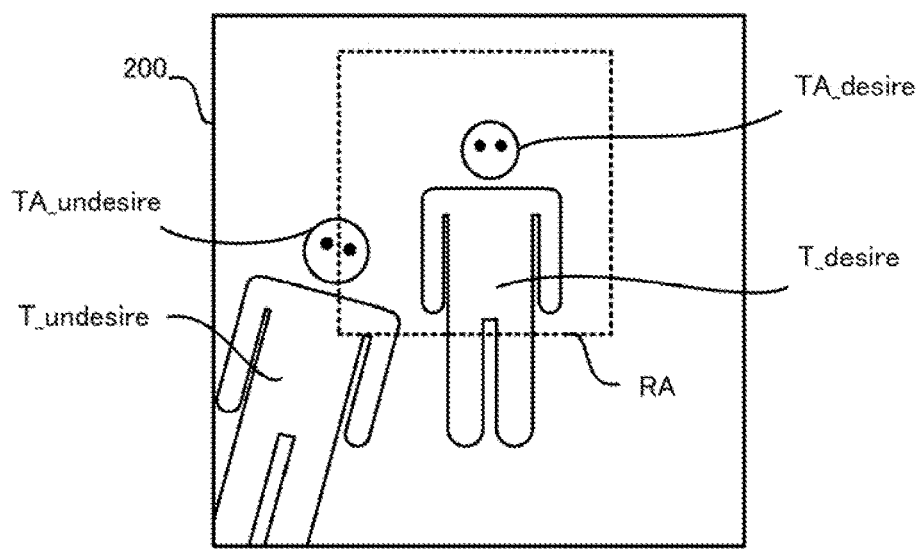
FIG. 10A is a planar view that illustrates the wide image in which two persons are included.

A situation where the person T that is undesirable to be selected as the authentication target person Ta enters the imaging range of the iris camera 31 from the side in front of the person T that is desirable to be selected as the authentication target person Ta is one example of a situation where the plurality of person T are included in the iris image area RA thereof, as illustrated in FIG. 10A. Hereinafter, the person T that is desirable to be selected as the authentication target person Ta is referred to as a "person T_desire" and the person T that is undesirable to be selected as the authentication target person Ta is referred to as a "person T_undesire" for convenience of description. This situation may be generated when the person T_undesire looks into the iris camera 31 from the side in front of the person T_desire, for example.

Figure 10B:
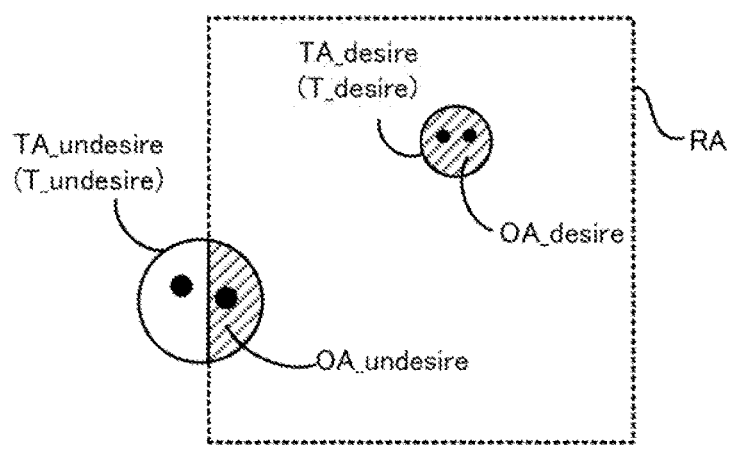
FIG. 10B is a planar view that illustrates a positional relationship between the face areas illustrated in FIG. 10A and the iris image area together with an overlapping degree of both.
Figure 10C:
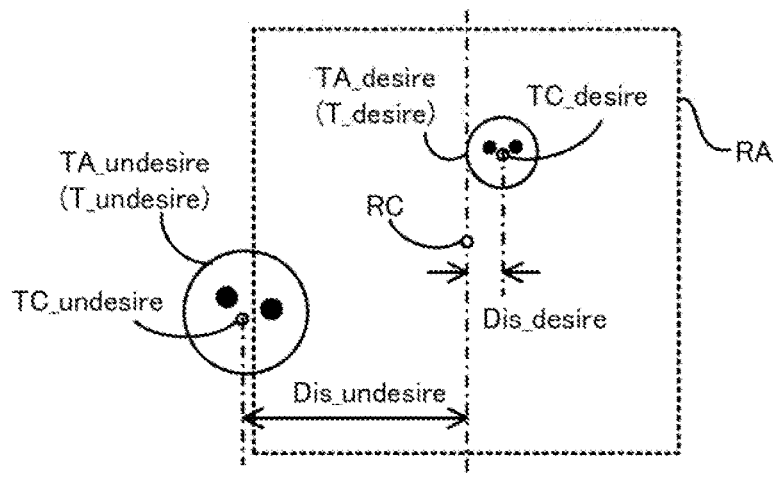
FIG. 10C is a planer view that illustrates the positional relationship between the face areas illustrated in FIG. 10A and the iris image area together with a proximity degree of both.

In the situation illustrated in FIG. 10A, since the person T_undesire looks into the iris camera 31 from the side, there is a higher possibility that at least a part of a face area TA_undesire of the person T_undesire is beyond the iris image area RA, compared to a face area TA_desire of the person T_desire. As a result, as illustrated in FIG. 10B that is a planar view illustrating a positional relationship between the face areas TA and the iris image area RA together with the overlapping degree of both, there is a high possibility that the ratio of an overlapping area OA_undesire of the person T_undesire is smaller than the ratio of an overlapping area OA_desire of the person T_desire. As a result, the target selection unit 612 can select, as the authentication person Ta, not the person T_undesire but the person T_desire by using the above described overlapping condition. Alternatively, as illustrated in FIG. 10C that is a planar view illustrating the positional relationship between the face areas TA and the iris image area RA together with the proximity degree of both, there is a high possibility that a distance Dis_undesire between a barycenter TC_undesire of the face area TA_undesire and the barycenter RC of the iris image area RA is longer than a distance Dis desire between a barycenter TC_desire of the face area TA_desire and the barycenter RC of the iris image area RA. As a result, the target selection unit 612 can select, as the authentication person Ta, not the person T_undesire but the person T_desire by using the above described proximity condition.

Incidentally, when the authentication target person Ta is not selected by using the selection condition in the situation illustrated in FIG. 10B, there is a possibility that the person T_undesire that is located in front of the person T_desire is selected as the authentication target person Ta. This is because the person T_undesire is the person that is located at the front. Thus, the iris authentication system 1 in the present example embodiment can properly select the authentication target person Ta especially in the situation where there is the person T_undesire that looks into the iris camera 31 from the side in front of the person T_desire. Of course, the fact remains that the iris authentication system 1 can properly select the authentication target person Ta by using the selection condition in a situation that is different from the situation where there is the person T_undesire that looks into the iris camera 31 from the side in front of the person T_desire.

(4) Modified Example (4-1) First Modified Example

Figure 11:
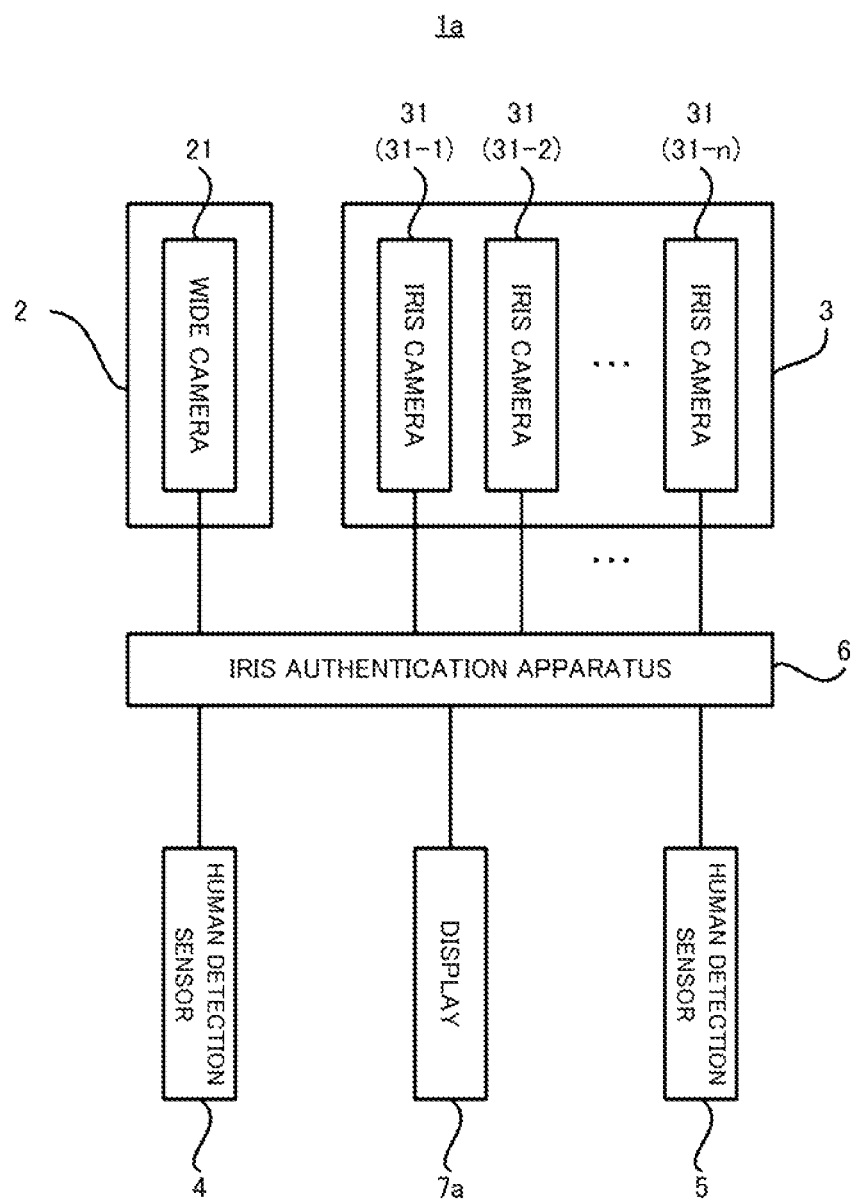
FIG. 11 is a block diagram that illustrates an entire configuration of an iris authentication system in the present example embodiment.

With reference to FIG. 11, an iris authentication system 1a in a first modified example will be described. FIG. 11 is a block diagram that illustrates the entire configuration of the iris authentication system 1a in the first modified example. Note that a detailed description of a component that is same as a component of the above described iris authentication system 1 is omitted by assigning the same reference number thereto.

As illustrated in FIG. 11, the iris authentication system 1a is different from the iris authentication system 1 in that it is further provided with a display 7a. Another characteristic of the iris authentication system 1a may be same as another characteristic of iris authentication system 1. Incidentally, when the iris authentication apparatus 6 is provided with the display that is one example of the output apparatus 66 (see FIG. 4), the display of the iris authentication apparatus 6 may be used as the display 7a.

The iris authentication apparatus 6 may control the display 7a so that the wide image 200 is displayed on the display 7a. Furthermore, the iris authentication apparatus 6 may control the display 7a so that an information relating to the iris authentication operation is displayed on the display 7a together with the wide image 200. Namely, the iris authentication apparatus 6 may control the display 7a so that the wide image to which the information relating to the iris authentication operation is added is displayed on the display 7a. Next, with reference to FIG. 12 and FIG. 13, a display example of the wide image 200 to which the information relating to the iris authentication operation is added will be described. Note that each of FIG. 12 and FIG. 13 is a planar view that illustrates the wide image in which two persons T are included.

Figure 12:
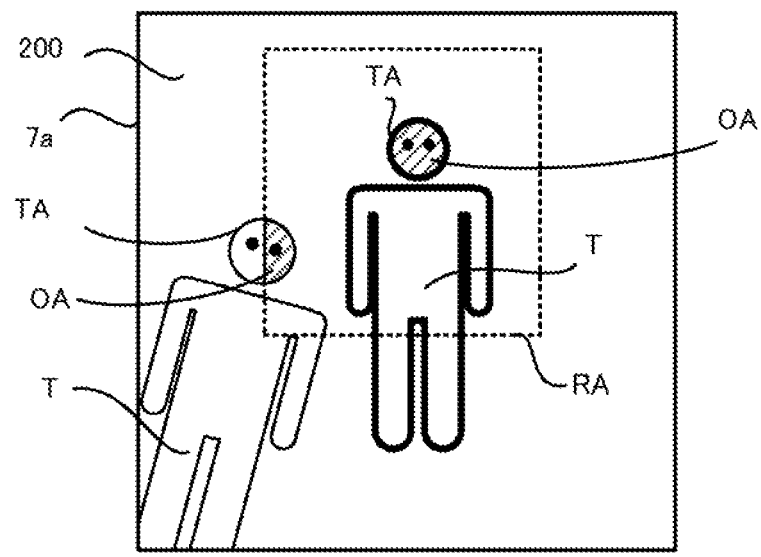
FIG. 12 is a planar view that illustrates a display example of the wide image to which an information relating to the iris authentication operation is added.
Figure 13:
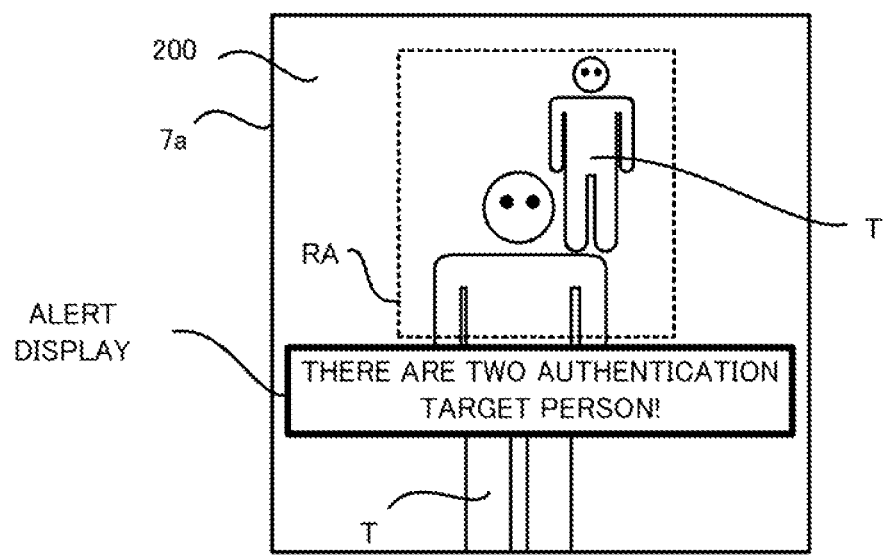
FIG. 13 is a planar view that illustrates a display example of the wide image to which the information relating to the iris authentication operation is added.

As illustrated in FIG. 12, the iris authentication apparatus 6 may control the display 7a to display the target area TA together with the wide image 200 in a display aspect that allows the target area TA to be identified in the wide image 200. Namely, the iris authentication apparatus 6 may control the display 7a to display the wide image 200 to which an information for identifying the target area TA in the wide image 200 (for example, a highlight display for distinguishing the target area TA from other image part) is added as the information relating to the iris authentication operation.

As illustrated in FIG. 12, the iris authentication apparatus 6 may control the display 7a to display the iris image area RA together with the wide image 200 in a display aspect that allows the iris image area RA to be identified in the wide image 200. Namely, the iris authentication apparatus 6 may control the display 7a to display the wide image 200 to which an information for identifying the iris image area RA in the wide image 200 (for example, a highlight display for distinguishing the iris image area RA from other image part) is added as the information relating to the iris authentication operation.

As illustrated in FIG. 12, the iris authentication apparatus 6 may control the display 7a to display the overlapping area OA together with the wide image 200 in a display aspect that allows the overlapping area OA to be identified in the wide image 200. Namely, the iris authentication apparatus 6 may control the display 7a to display the wide image 200 to which an information for identifying the overlapping area OA in the wide image 200 (for example, a highlight display for distinguishing the overlapping area OA from other image part) is added as the information relating to the iris authentication operation.

As illustrated in FIG. 12, the iris authentication apparatus 6 may control the display 7a to display the person T that is selected as the authentication target person Ta together with the wide image 200 in a display aspect that allows the person T that is selected as the authentication target person Ta to be identified in the wide image 200. Namely, the iris authentication apparatus 6 may control the display 7a to display the wide image 200 to which an information for identifying the person T that is selected as the authentication target person Ta in the wide image 200 (for example, a highlight display for distinguishing the person T that is selected as the authentication target person Ta from other image part) is added as the information relating to the iris authentication operation.

As illustrated in FIG. 12, the iris authentication apparatus 6 may control the display 7a to display the person T that is not selected as the authentication target person Ta together with the wide image 200 in a display aspect that allows the person T that is not selected as the authentication target person Ta to be identified in the wide image 200. Namely, the iris authentication apparatus 6 may control the display 7a to display the wide image 200 to which an information for identifying the person T that is not selected as the authentication target person Ta in the wide image 200 (for example, a highlight display for distinguishing the person T that is not selected as the authentication target person Ta from other image part) is added as the information relating to the iris authentication operation.

As illustrated in FIG. 13, the iris authentication apparatus 6 may control the display 7a to alert-display an abnormal event relating to the iris authentication (namely, an abnormal even that may cause a trouble on the normal iris authentication.). Namely, the iris authentication apparatus 6 may control the display 7a to display the wide image 200 to which an information relating to the abnormal event is added as the information relating to the iris authentication operation. For example, FIG. 13 illustrates an example that alert-displays that the two or more persons T are selected as the authentication target person Ta (namely, the number of the face area TA satisfying the selection condition is equal to or larger than 2) at the above described step S23 in FIG. 6. In this case, although one authentication target person Ta is selected as a general rule by the process of the step S23 in FIG. 26, it is advantageous in that the user of the iris authentication system 1a can check whether or not one authentication target person Ta selected in this manner is proper (namely, the selection of the authentication target person Ta is properly performed).

The iris authentication system 1a in the first modified example can achieve an effect that is same as the effect achievable by the above described iris authentication system 1. Furthermore, in the iris authentication system 1a in the first modified example, the user of the iris authentication system 1a can properly recognize a situation of the iris authentication operation by checking the displayed content of the display 7a. As a result, the user can take proper action (for example, take an action against the abnormal event) as necessary.

(4-2) Second Modified Example

In a second modified example, the iris authentication apparatus 6 may use the selection condition that includes a condition based on a temporal change of the positional relationship between the face area TA and the iris image area RA. For example, when a changed amount per unit time of the positional relationship between the face area TA and the iris image area RA is smaller than a predetermined first allowable amount, the iris authentication apparatus 6 may select the person T that corresponds to this face area TA as the authentication target person Ta. When the changed amount per unit time of the positional relationship between the face area TA and the iris image area RA is larger than the first allowable amount, the iris authentication apparatus 6 may not select the person T that corresponds to this face area TA as the authentication target person Ta.

When the above described overlapping condition is used as the selection condition, the iris authentication apparatus 6 may use the overlapping condition that includes a condition based on a temporal change of the overlapping degree of the face area TA and the iris image area RA (typically, a temporal change of the ratio of the overlapping area OA to the face area TA). For example, when a changed amount per unit time of the ratio of the overlapping area OA to the face area TA is smaller than a predetermined second allowable amount, the iris authentication apparatus 6 may select the person T that corresponds to this face area TA as the authentication target person Ta. For example, when the ratio of the overlapping area OA to the face area TA is larger than the above described first threshold value and the changed amount per unit time of the ratio of the overlapping area OA to the face area TA is smaller than the second allowable amount, the iris authentication apparatus 6 may select the person T that corresponds to this face area TA as the authentication target person Ta. For example, when the changed amount per unit time of the ratio of the overlapping area OA to the face area TA is larger than the second allowable amount, the iris authentication apparatus 6 may not select the person T that corresponds to this face area TA as the authentication target person Ta. For example, when the changed amount per unit time of the ratio of the overlapping area OA to the face area TA is larger than the second allowable amount although the ratio of the overlapping area OA to the face area TA is larger than the above described first threshold value, the iris authentication apparatus 6 may not select the person T that corresponds to this face area TA as the authentication target person Ta.

When the above described proximity condition is used as the selection condition, the iris authentication apparatus 6 may use the proximity condition that includes a condition based on a temporal change of the proximity degree of the face area TA and the iris image area RA (typically, the distance Dis between the feature point of the face area TA and the feature point of the iris image area RA). For example, when a changed amount per unit time of the distance Dis is smaller than a predetermined third allowable amount, the iris authentication apparatus 6 may select the person T that corresponds to this face area TA as the authentication target person Ta. For example, when the distance Dis is smaller than the above described second threshold value and the changed amount per unit time of the distance Dis is smaller than the third allowable amount, the iris authentication apparatus 6 may select the person T that corresponds to this face area TA as the authentication target person Ta. For example, when the changed amount per unit time of the distance Dis is larger than the third allowable amount, the iris authentication apparatus 6 may not select the person T that corresponds to this face area TA as the authentication target person Ta. For example, when the changed amount per unit time of the distance Dis is larger than the third allowable amount although the distance Dis is smaller than the above described second threshold value, the iris authentication apparatus 6 may not select the person T that corresponds to this face area TA as the authentication target person Ta.

The iris authentication system 1 can select the authentication target person Ta more properly by using the condition based on the temporal change of the positional relationship between the face area TA and the iris image area RA in this manner. Next, its reason will be described with reference to FIG. 14A and FIG. 14B.

FIG. 14A is a planar view that illustrates the wide image 200 that includes the person T_desire and the person T_undesire at a time t1. FIG. 14B is a planar view that illustrates the wide image 200 that includes the person T_desire and the person T_undesire at a time t2 at which a certain time has elapsed from the time t1. FIG. 14C is a planar view that illustrates the wide image 200 that includes the person T_desire and the person T_undesire at a time t3 at which a certain time has elapsed from the time t2. As illustrated in FIG. 14A to FIG. 14C, it is assumed that the person T_desire moves toward the iris camera 31 and the person T_undesire moves to look into the iris camera from the side. In this case, there is a relatively high possibility that the person T_undesire is included in the wide image 200 in a manner in which he moves from an outside of the iris image area RA to an inside of the iris image area RA. Thus, there is a relatively high possibility that the ratio of the overlapping area OA of the person T_undesire increases from 0% to 100%. On the other hand, there is a relatively high possibility that the person T_desire is included in the wide image 200 so that he is always in the iris image area RA. Thus, there is a relatively high possibility that the ratio of the overlapping area OA of the person T_desire is kept to be 100%. Therefore, there is a high possibility that the ratio of the overlapping area OA of the person T_undesire changes more largely per unit time than the ratio of the overlapping area OA of the person T_desire. Moreover, there is a high possibility that the distance Dis of the person T_undesire changes more largely per unit time than the distance Dis of the person T_desire, although it is not illustrated in the drawing for simplification of description. Thus, the target selection unit 612 can distinguish the person T_desire from the person T_undesire on the basis of the temporal change of the ratio of the overlapping area OA and/or the temporal change of the distance Dis. Namely, the target selection unit 612 can properly select not the person T_undesire but the person T_desire as the authentication target person Ta.

(4-3) Other Modified Example

In the above described description, when the plurality of persons T are included in the wide image 200 (especially, the iris image area RA thereof) (namely, the plurality of face areas TA are detected), the target selection unit 612 selects one of the plurality of persons T as the authentication target person Ta. However, the target selection unit 612 may select two or more of the plurality of persons T as the authentication target persons Ta. For example, the target selection unit 612 may select two or more persons T satisfying the selection condition as the authentication target persons Ta. For example, the target selection unit 612 may not select one person T that is located at the front as the authentication target person Ta when there are two or more persons T satisfying the selection condition (the step S25 in FIG. 6: No).

In the above described description, the distance Dis used by the proximity condition that is one example of the predetermined selection condition is the distance in the direction (for example, the horizontal direction) that intersects with the direction (for example, the vertical direction) in which the imaging ranges of the plurality of iris cameras 31 area arranged. However, the distance Dis may be a distance in any direction. For example, the distance Dis may be a minimum distance (what we call a Euclidean distance) between the feature point of the face area TA and the feature point of the iris image area RA. For example, the distance Dis may be a distance between the feature point of the face area TA and the feature point of the iris image area RA in the direction (for example, the vertical direction) in which the imaging ranges of the plurality of iris cameras 31 area arranged.

In the above described description, when the target portion TP is the eye of the person T, the area in which the face of the person T is included (namely, the face area) is used as the target area TA. However, when the target portion TP is the eye of the person T, an area that is different from the face area may be used as the target area TA. For example, an area in which the eye of the person T is included (namely, an area in which only eye or not only the eye but also a scene around the eye (for example, a part of the face) is included) may be used as the target area TA. For example, an area in which not only at least one of the eye and the face of the person T but also a body (for example, at least one of a neck, a trunk, an arm, a hand and a leg) of the person T are included may be used as the target area TA.

The iris imaging apparatus 3 may be provided with single iris camera 31. In this case, the imaging range of the iris camera 31 may be set to be a proper range so that the iris camera 31 is configured to capture the image of the target portion TP of the person T located at the focus point P2 regardless of the height of the person T. Moreover, when the iris imaging apparatus 3 may be provided with single iris camera 31, the camera set unit 613 may not perform the process at the step S31 of FIG. 6 (namely, the process of selecting one iris camera 31 that captures the image of the authentication target person Ta).

The camera set unit 613 may not perform the process of setting the region of interest IA (the process corresponding to the step S32 of FIG. 6). In this case, the iris authentication system 1 may not operate in the region of interest mode. Specifically, the image obtaining unit 611 may obtain whole of the iris image 300 captured by the iris camera 31. The authentication unit 615 may perform the iris authentication by using whole of the iris image 300 captured by the iris camera 31.

In the above described description, the iris authentication apparatus 6 is provided with the image obtaining unit 611, the target selection unit 612, the camera set unit 613, the imaging control unit 614 and the authentication unit 615. However, as illustrated in FIG. 15 that is a block diagram illustrating a modified example of the iris authentication apparatus 6, the iris authentication apparatus 6 may not be provided with at least one of the camera set unit 613, the imaging control unit 614 and the authentication unit 615. In this case, an apparatus outside the iris authentication apparatus 6 may perform the process that is performed by each of the camera set unit 613, the imaging control unit 614 and the authentication unit 615.

In the above described description, the iris authentication system 1 is provided with the human detection sensor 4. However, the iris authentication system 1 may not be provided with the human detection sensor 4. In this case, the wide camera 21 may keep capturing the image of the scene in the imaging range at a predetermined frame rate (namely, an imaging rate) regardless of whether the person T is located at the trigger point P1. Typically, the wide camera 21 may keep capturing the image of the scene in the imaging range at the predetermined frame rate during at least a period when the person T passes through the trigger point P1. As a result, even when the iris authentication system 1 is not provided with the human detection sensor 4, the wide camera 21 is able to capture the image of the person T at a timing when the person T reaches the trigger point P1. Namely, even when the iris authentication system 1 is not provided with the human detection sensor 4, the image obtaining unit 611 is able to obtain the wide image 200 including the person T located at the trigger point P1.

When the iris authentication system 1 is not provided with the human detection sensor 4, the iris authentication apparatus 6 (for example, the target selection unit 612) may determine whether or not the wide image 200 including the person T located at the trigger point P1 is obtained by performing an image analysis on the wide image 200. Namely, the iris authentication apparatus 6 may determine whether or not the person T is located at the trigger point P1 by performing the image analysis on the wide image 200. When it is determined that the person T is located at the trigger point P1 (namely, the wide image 200 including the person T located at the trigger point P1 is obtained), the iris authentication apparatus 6 performs the process of selecting one iris camera 31 for capturing the image of the person T (especially, the authentication target person Ta) located at the focus point P2 (specifically, a series of processes from the step S21 to the step S32 of FIG. 6) on the basis of the wide image 200. On the other hand, when it is determined that the authentication target person T is not located at the trigger point P1, the iris authentication apparatus 6 does not start a series of processes from the step S21 to the step S32 of FIG. 6. Note that the iris authentication apparatus 6 may use an existing method as a method for the image analysis for determining whether or not the person T is located at the trigger point P1. For example, the iris authentication apparatus 6 may determine whether or not the person T is located at the trigger point P1 by estimating a depth from the wide image 200. For example, the iris authentication apparatus 6 may determine whether or not the person T is located at the trigger point P1 by detecting a foot of the person T included in the wide image 200 and determining whether or not the detected foot is located at the trigger point P1. For example, the iris authentication apparatus 6 may determine whether or not the person T is located at the trigger point P1 by determining whether or not the interval between both eyes of the person T included in the wide image 200 is a predetermined value.

In the above described description, the iris authentication system 1 is provided with the human detection sensor 5. However, the iris authentication system 1 may not be provided with the human detection sensor 5. In this case, the iris camera 31 on which the region of interest IA is already set may keep capturing the image of the scene in the imaging range at a predetermined frame rate (namely, an imaging rate) regardless of whether the person T (especially, the authentication target person Ta) is located at the focus point P2 after the region of interest IA of the iris camera 31 is set at the step S32 of FIG. 6. Typically, the iris camera 31 may keep capturing the image of the scene in the imaging range at the predetermined frame rate (namely, the imaging rate) during at least a period when the authentication target person Ta passes through the focus point P2. As a result, even when the iris authentication system 1 is not provided with the human detection sensor 5, the iris camera 31 is able to capture the image of the authentication target person Ta at a timing when the authentication target person Ta reaches the focus point P2 from the trigger point P1. Namely, even when the iris authentication system 1 is not provided with the human detection sensor 5, the image obtaining unit 611 is able to obtain the iris image 300 including the authentication target person Ta located at the focus point P2.

The iris authentication system 1 may authenticate the authentication target person Ta by using any part of the authentication target person Ta in addition to or instead of authenticating the authentication target person Ta by using the iris of the authentication target person Ta. Namely, any authentication system that authenticates the authentication target person Ta by using any part of the authentication target person Ta may have a configuration and performs an operation that are same as those of the iris authentication system 1. A face authentication system that authenticates the authentication target person Ta by using the face of the authentication target person Ta is one example of any authentication system. In this case, the face is used as the target portion TP instead of the above described eye. Therefore, the iris authentication system 1 may be provided with at least one face camera that is configured to capture an image of the face of the authentication target person Ta instead of the iris imaging apparatus 3. The face camera may be same as the above described iris camera 31 except that it is configured to capture the image of the face of the authentication target person Ta. Moreover, the iris authentication system 1 may authenticate the authentication target person Ta on the basis of the image captured by the face camera.

(5) Supplementary Note

With respect to the example embodiments described above, the following Supplementary Notes will be further disclosed.

(5-1) Supplementary Note 1

An authentication system according to a Supplementary Note 1 is an authentication system that is provided with:
a first imaging apparatus that obtains a first image used for an authentication by capturing an image of a first imaging range;
a second imaging apparatus that obtains a second image by capturing an image of a second imaging range that is wider than the first imaging range; and
a control apparatus that selects a target person for the authentication on the basis of a target area in the second image that includes a predetermined portion of a person and a reference area in the second image that corresponds to the first imaging range.

(5-2) Supplementary Note 2

An authentication system according to a Supplementary Note 2 is the authentication system according to the Supplementary Note 1, wherein
the control apparatus selects the target person on the basis of a positional relationship between the target area and the reference area.

(5-3) Supplementary Note 3

An authentication system according to a Supplementary Note 3 is the authentication system according to the Supplementary Note 1 or 2, wherein
the control apparatus selects the target person on the basis of an overlapping area in the target area that overlaps with the reference area.

(5-4) Supplementary Note 4

An authentication system according to a Supplementary Note 4 is the authentication system according to the Supplementary Note 3, wherein
the control apparatus selects the target person on the basis of a ratio of the overlapping area to the target area.

(5-5) Supplementary Note 5

An authentication system according to a Supplementary Note 5 is the authentication system according to the Supplementary Note 4, wherein
the control apparatus selects, as the target person, a person corresponding to the target area that includes the overlapping area the ratio of which is larger than a predetermined first threshold value.

(5-6) Supplementary Note 6

An authentication system according to a Supplementary Note 6 is the authentication system according to any one of the Supplementary Notes 1 to 5, wherein
the control apparatus selects the target person on the basis of a distance between a barycenter of the target area and a barycenter of the reference area of the second image.

(5-7) Supplementary Note 7

An authentication system according to a Supplementary Note 7 is the authentication system according to the Supplementary Note 6, wherein
the control apparatus determines, as the target person, a person corresponding to the target area the distance of which is shorter than a predetermined second threshold value.

(5-8) Supplementary Note 8

An authentication system according to a Supplementary Note 8 is the authentication system according to the Supplementary Note 6 or 7, wherein
the feature point includes a barycenter.

(5-9) Supplementary Note 9

An authentication system according to a Supplementary Note 9 is the authentication system according to the Supplementary Note 8, wherein the first imaging apparatus includes a plurality of imaging units that are configured to obtain a plurality of unit images, respectively, each of which is usable as the first image, the plurality of imaging units are arranged so that scenes included in the plurality of unit images are connected along a first direction, the barycenter of the target area is a barycenter of the target area in a second direction that intersects with the first direction, the barycenter of the reference area is a barycenter of the reference area in the second direction.

(5-10) Supplementary Note 10

An authentication system according to a Supplementary Note 10 is the authentication system according to any one of the Supplementary Notes 1 to 9 that is further provided with a display apparatus that displays the second image.

(5-11) Supplementary Note 11

An authentication system according to a Supplementary Note 11 is the authentication system according to the Supplementary Note 10, wherein the display apparatus displays at least one of the target area, the reference area, an overlapping area in the target area that overlaps with the reference area, a person that is selected as the target person and a person that is not selected as the target person in a display aspect that allows it to be identified in the second image together with the second image.

(5-12) Supplementary Note 12

An authentication system according to a Supplementary Note 12 is the authentication system according to the Supplementary Note 10 or 11, wherein the display apparatus displays an abnormal event relating to the authentication.

(5-13) Supplementary Note 13

An authentication system according to a Supplementary Note 13 is the authentication system according to any one of the Supplementary Notes 1 to 12, wherein the control apparatus selects the target person on the basis of a temporal change of a positional relationship between the target area and the reference area.

(5-14) Supplementary Note 14

An authentication system according to a Supplementary Note 14 is the authentication system according to the Supplementary Note 13, wherein when a changed amount per unit time of the positional relationship between the target area and the reference area is larger than an allowable value, the control apparatus does not select, as the target person, a person corresponding to this target area.

(5-15) Supplementary Note 15

An authentication system according to a Supplementary Note 15 is the authentication system according to the Supplementary Note 13 or 14, wherein when a changed amount per unit time of a ratio of an overlapping area in the target area that overlaps with the reference area to the target area is larger than an allowable value, the control apparatus does not select, as the target person, a person corresponding to this target area.

(5-16) Supplementary Note 16

An authentication system according to a Supplementary Note 16 is the authentication system according to any one of the Supplementary Notes 13 to 15, wherein when a changed amount per unit time of a distance between a feature point of the target area and a feature point of the reference area is larger than an allowable value, the control apparatus does not select, as the target person, a person corresponding to this target area.

(5-17) Supplementary Note 17

An authentication system according to a Supplementary Note 17 is the authentication system according to any one of the Supplementary Notes 1 to 16, wherein the second imaging apparatus includes a plurality of imaging units, the control apparatus selects one imaging unit for capturing an image of the selected target person from the plurality of imaging units and controls the selected one imaging unit to capture the image of the selected target person to obtain the first image.

(5-18) Supplementary Note 18

An authentication system according to a Supplementary Note 18 is the authentication system according to any one of the Supplementary Notes 1 to 17, wherein the predetermined portion includes at least one of an eye and a face.

(5-19) Supplementary Note 19

An authentication system according to a Supplementary Note 19 is the authentication system according to any one of the Supplementary Notes 1 to 18, wherein the authentication includes at least one of an iris authentication and a face authentication, the authentication system is at least one of an iris authentication system and a face authentication system.

(5-20) Supplementary Note 20

An authentication method according to a Supplementary Note 20 is an authentication method that includes:

an obtaining step that obtains a second image from a second imaging apparatus that obtains the second image by capturing an image of a second imaging range that is wider than a first imaging range of a first imaging apparatus that obtains a first image used for an authentication; and a selection step that selects a target person for the authentication on the basis of a target area in the second image that includes a predetermined portion of a person and a reference area in the second image that corresponds to the first imaging range.

(5-21) Supplementary Note 21

A control apparatus according to a Supplementary Note 21 is a control apparatus that is provided with:

an obtaining unit that obtains a second image from a second imaging apparatus that obtains the second image by capturing an image of a second imaging range that is wider than a first imaging range of a first imaging apparatus that obtains a first image used for an authentication; and a selecting unit that selects a target person for the authentication on the basis of a target area in the second image that includes a predetermined portion of a person and a reference area in the second image that corresponds to the first imaging range.

(5-22) Supplementary Note 22

A computer program described in a Supplementary Note 22 is a computer program that allows a computer to execute the imaging method described in Supplementary Note 20.

(5-23) Supplementary Note 23

A recording medium described in a Supplementary Note 23 is a recording medium on which the computer program described in Supplementary Note 22 is recorded.

The present disclosure is allowed to be changed, if desired, without departing from the essence or spirit of the invention which can be read from the claims and the entire specification, and an authentication system, an authentication method, a control apparatus, a computer program and a recording medium, which involve such changes, are also intended to be within the technical scope of the present disclosure.

DESCRIPTION OF REFERENCE CODES 1 iris authentication system
2 wide imaging apparatus
21 wide camera
200 wide image
3 iris imaging apparatus
31 iris camera
300 iris image
4, 5 human detection sensor
6 iris authentication apparatus
4, 5 CPU
611 image obtaining unit
612 target selection unit
613 camera set unit
614 imaging control unit
615 authentication unit

What is claimed is:

1. An authentication system comprising:
    a first imager that obtains a first image used for authentication by capturing an image of a first imaging range;
    a second imager that obtains a second image by capturing an image of a second imaging range that is wider than the first imaging range;
    a controller that is programmed to:
        select a target person for the authentication from a plurality of persons in the second image, on the basis of a target area in the second image that includes a face of a person and a reference area in the second image that corresponds to the first imaging range, the reference area being wider than the target area;
        acquire an iris image of the selected target person from a region of interest (ROI) within the first imaging range, the ROI being narrower than the target area and the reference area; and
        perform the authentication of the selected target person using the acquired iris image.

2. The authentication system according to claim 1, wherein
    the controller is programmed to select the target person on the basis of a positional relationship between the target area and the reference area.

3. The authentication system according to claim 1, wherein
    the controller is programmed to select the target person on the basis of an overlapping area in the target area that overlaps with the reference area.

4. The authentication system according to claim 3, wherein
    the controller is programmed to select the target person on the basis of a ratio of the overlapping area to the target area.

5. The authentication system according to claim 4, wherein
    the controller is programmed to select, as the target person, the person corresponding to the target area that includes the overlapping area having a ratio larger than a predetermined first threshold value.

6. An authentication method performed by a computer and comprising:
    obtaining a second image from a second imager that obtains the second image by capturing an image of a second imaging range that is wider than a first imaging range of a first imager that obtains a first image used for authentication;
    selecting a target person for the authentication from a plurality of persons in the second image, on the basis of a target area in the second image that includes a face of a person and a reference area in the second image that corresponds to the first imaging range, the reference area being wider than the target area;
    acquiring an iris image of the selected target person from a region of interest (ROI) within the first imaging range, the ROI being narrower than the target area and the reference area; and
    performing the authentication of the selected target person using the acquired iris image.

7. A non-transitory recording medium storing a computer program that causes the computer to execute the authentication method according to claim 6.

8. A control apparatus comprising a controller programmed to:
    obtain a second image from a second imager that obtains the second image by capturing an image of a second imaging range that is wider than a first imaging range of a first imager that obtains a first image used for an authentication;
    select a target person for the authentication from a plurality of persons in the second image, on the basis of a target area in the second image that includes a face of a person and a reference area in the second image that corresponds to the first imaging range, the reference area being wider than the target area;
    acquire an iris image of the selected target person from a region of interest (ROI) within the first imaging range, the ROI being narrower than the target area and the reference area; and
    perform the authentication of the selected target person using the acquired iris image.

* * * * *